United States Patent
Minegishi et al.

(10) Patent No.: US 11,205,402 B2
(45) Date of Patent: Dec. 21, 2021

(54) INFORMATION DISPLAY APPARATUS AND METHOD, AND RECORDING MEDIUM

(71) Applicant: MITSUBISHI ELECTRIC CORPORATION, Tokyo (JP)

(72) Inventors: Aki Minegishi, Tokyo (JP); Yoshitomo Nakamura, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/627,470

(22) PCT Filed: Jul. 19, 2018

(86) PCT No.: PCT/JP2018/027080
§ 371 (c)(1),
(2) Date: Dec. 30, 2019

(87) PCT Pub. No.: WO2019/058734
PCT Pub. Date: Mar. 28, 2019

(65) Prior Publication Data
US 2021/0151007 A1     May 20, 2021

(30) Foreign Application Priority Data
Sep. 25, 2017   (JP) .............................. JP2017-183839

(51) Int. Cl.
*G09G 5/02*   (2006.01)
*G09G 5/377*   (2006.01)
(Continued)

(52) U.S. Cl.
CPC ............. *G09G 5/377* (2013.01); *B60K 35/00* (2013.01); *G06F 3/012* (2013.01); *G06T 7/70* (2017.01);
(Continued)

(58) Field of Classification Search
CPC .... G09G 5/02; G09G 5/06; G09G 2320/0666; G09G 2340/06; G09T 11/001
(Continued)

(56) References Cited

U.S. PATENT DOCUMENTS

2006/0055711 A1   3/2006   Hayakawa
2015/0254891 A1   9/2015   Oka
(Continued)

FOREIGN PATENT DOCUMENTS

JP   2006-72577 A    3/2006
JP   2007-292574 A   11/2007
(Continued)

*Primary Examiner* — Gordon G Liu
(74) *Attorney, Agent, or Firm* — Birch, Stewart, Kolasch & Birch, LLP

(57) ABSTRACT

In an information display apparatus and method, images of a plurality of planar objects disposed in a virtual space are generated based on texture information of each of the objects, viewpoint information, and surrounding environment information, and combined to generate a display image. The virtual space is a simulation of a space in which a display device is placed, the objects are disposed in parallel with a plane in the virtual space corresponding to a display screen of the display device. The texture can be expressed with a small quantity of data and a small memory size, and an image which has a good reality can be displayed with a good responsiveness to the motion of the observer.

14 Claims, 17 Drawing Sheets

(51) Int. Cl.
- *G06T 7/70* (2017.01)
- *B60K 35/00* (2006.01)
- *G06F 3/01* (2006.01)
- *G09G 3/00* (2006.01)
- *G09G 5/10* (2006.01)

(52) U.S. Cl.
CPC ............... *G09G 3/003* (2013.01); *G09G 5/10* (2013.01); *B60K 2370/176* (2019.05); *B60K 2370/21* (2019.05); *B60K 2370/31* (2019.05); *B60K 2370/334* (2019.05); *B60K 2370/52* (2019.05); *G06T 2207/30196* (2013.01); *G09G 2320/0261* (2013.01); *G09G 2320/0686* (2013.01); *G09G 2340/10* (2013.01); *G09G 2340/12* (2013.01); *G09G 2380/10* (2013.01)

(58) Field of Classification Search
USPC ......................................................... 345/589
See application file for complete search history.

(56) References Cited

U.S. PATENT DOCUMENTS

| | | | |
|---|---|---|---|
| 2016/0274658 A1* | 9/2016 | Ogasawara | G09G 5/00 |
| 2019/0178669 A1* | 6/2019 | Lee | G01C 21/365 |
| 2019/0204076 A1* | 7/2019 | Nishi | G08G 1/161 |

FOREIGN PATENT DOCUMENTS

| | | | |
|---|---|---|---|
| JP | 2010-58633 A | 3/2010 | |
| JP | 2014-52343 A | 3/2014 | |
| JP | 2015-105064 A | 6/2015 | |
| WO | WO 2014/020801 A1 | 2/2014 | |

\* cited by examiner

VISIBLE SURFACE

NORMAL DIRECTION

INFORMATION DISPLAY APPARATUS AND METHOD, AND RECORDING MEDIUM

TECHNICAL FIELD

The present invention relates to an information display apparatus and method, and a program and a recording medium. In particular, the present invention relates to an information display apparatus and method, and a program and a recording medium which can express the texture of a displayed article, and which can display the displayed article with an improved reality. For example, the information display apparatus according to the present invention is used as a display apparatus for use in a vehicle, for example, as a display apparatus for displaying an instrument panel.

BACKGROUND ART

For example, an information display apparatus displays information using a display device formed, for example, of a CRT (Cathode Ray Tube) display, a liquid crystal display, an LED (Light Emitting Diode) display, an organic EL (Electroluminescence) display, or the like.

In recent years, the scope of application of information display apparatuses is expanding in line with the digitalization of information. For example, information display apparatuses have come to be used for display of vehicle information. In an application of display of vehicle information by means of an information display apparatus, an image representing an analog type instrument is generated by computer graphics technology, and displayed on a two-dimensional display device. In such a display, improvement of the texture and reality is at issue.

In patent reference 1, the sight direction of the passenger of the vehicle is acquired, and the mode of display of the instrument, for example, the mode of the reflected light, is estimated based on the acquired result.

PRIOR ART REFERENCES

Patent References

[Patent reference 1] Japanese Patent Publication No. 2010-58633 (Pages 5-7, FIG. 1)

SUMMARY OF THE INVENTION

Problems to be Solved by the Invention

A problem encountered by the patent reference 1 is that three-dimensional shapes of the instrument are used for the calculation of the mode of display, so that the quantity of the data to be processed is large, the processing load is heavy, and the responsiveness to the motion of the observer is poor.

The present invention has been made in view of such a situation, and its object is to provide an information display apparatus and method by which the texture can be expressed, the responsiveness to the motion of the observer is good, and the displayed image has an improved reality, and yet the quantity of data to be processed and the size of the memory required are small.

Means for Solving the Problem

The information display apparatus according to the present invention includes:

an image processing device to generate a display image representing a displayed article;

a display device to display said display image;

an observer imaging device to capture an image of an observer watching said display device, and output an observer image: and a surrounding environment imaging device to capture an image of an environment surrounding said display device, and output a surrounding environment image;

wherein said image processing device includes:

a viewpoint information processor to generate viewpoint information representing a position and motion of a viewpoint of said observer based on said observer image;

an environment information processor to generate surrounding environment information representing an optical environment surrounding said display device based on said surrounding environment image; and a display image generator to generate images of a plurality of planar objects disposed in a virtual space, based on texture information pertaining to each of said objects, and said viewpoint information and said surrounding environment information, and combine the images of said plurality of objects to generate said display image.

Effect of the Invention

According to the present invention, the objects corresponding to the visible surfaces of the plurality of constituent parts of the displayed article are planar, and do not have a three-dimensional shape, so that the quantity of data and the processing load can be reduced, and the responsiveness to the motion of the viewpoint of the observer can be improved.

MODE FOR CARRYING OUT THE INVENTION

First Embodiment

Figure 1:
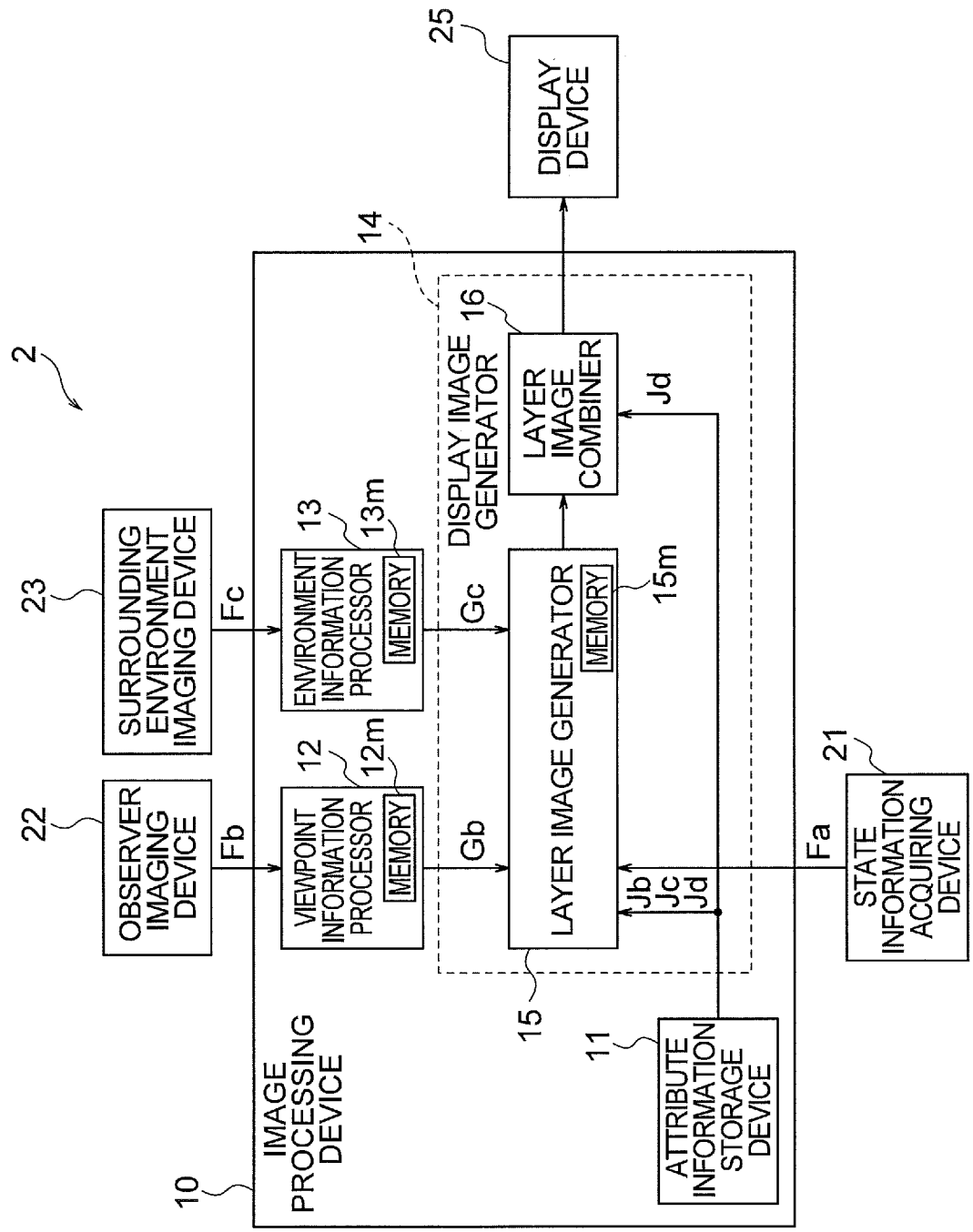
FIG. 1 is a block diagram schematically showing a configuration of an information display apparatus 2 according to a first embodiment of the present invention.

FIG. 1 schematically shows a configuration of an information display apparatus 2 according to a first embodiment of the present invention.

As shown in FIG. 1, the information display apparatus 2 includes an image processing device 10, a state information acquiring device 21, an observer imaging device 22, a surrounding environment imaging device 23, and a display device 25.

The image processing device 10 displays an image representing a displayed article. The displayed article is for example an instrument panel indicating information concerning a vehicle (rotational speed of the engine, travel speed of the vehicle, and the like).

The "vehicle" referred herein includes a four-wheeled vehicle, such as a passenger car, and a two-wheeled vehicle.

The display device 25 displays an image generated by the image processing device 10. The display device 25 may for example be formed of a two-dimensional display such as a liquid crystal display, an organic EL display, a plasma display, an aerial display or the like.

When the displayed article is an instrument panel of a vehicle, the display device 25 is disposed at a position where the instrument panel should be disposed, for example on a dashboard. In this case, the observer (e.g., driver) acquires information concerning the vehicle by watching the image displayed by the display device 25, instead of the instrument panel.

The image processing device 10 generates an image which is similar to an image which would be seen from the observer when the displayed article is hypothetically placed at the position of the display device 25.

The image processing device 10 generates an image by graphics technology. Specifically, a plurality of objects are disposed in a virtual space, and projected onto a virtual projection plane, thereby to generate an image. The virtual space is a space simulating a space in which the displayed article is placed, and hence a space (real space) in which the display device 25 is placed. The virtual projection plane is disposed in parallel with a plane (virtual display screen) in the virtual space corresponding to the display screen of the display device 25 in the real space.

The plurality of objects are planar objects disposed in parallel with the virtual display screen, respectively correspond to the surfaces (visible surfaces) of a plurality of constituent parts of the displayed article which are visible from the observer, and are disposed at depthwise positions in the virtual space, corresponding to the depthwise positions of the corresponding visible surfaces of the displayed article.

The depthwise positions of the visible surfaces of the displayed article are the depthwise positions as seen from the observer when the displayed article is placed at the position of the display device 25, and are defined for example as distances from a reference plane which includes the viewpoint of the observer and is parallel with the display screen of the display device 25.

The depthwise positions in the virtual space are depthwise positions of the objects disposed in the virtual space, as seen from the observer imagined in the virtual space, and are defined for example as distances from a reference plane which includes the viewpoint of the observer imagined in the virtual space (corresponding to the viewpoint of the observer in the real space) and is parallel with the virtual display screen.

Each object is treated as belonging to a layer imagined at the same depthwise position as the depthwise position of the above-mentioned each object. Each layer is a plane parallel with the virtual display screen, and one or more objects belong to each layer.

The state information acquiring device 21 acquires state information Fa determining the state of the displayed article. When the displayed article is an instrument panel of a vehicle, the state of the instrument panel which is the displayed article (the positions of pointers of instruments, the luminance or color of indicators) is determined based on the state of the vehicle (the rotational speed of the engine, the travel speed of the vehicle, the state of the direction indicator, and the like). In this case, information indicating the state of the vehicle (vehicle information) is acquired as the state information.

The observer imaging device 22 captures the image of the observer 4, particularly the head of the observer 4, who is watching the display device 25, and outputs the captured image as an observer image Fb. When the displayed article is an instrument panel of a vehicle, the observer is usually the driver.

The surrounding environment imaging device 23 captures the image of the environment surrounding the display device 25, and outputs the captured image as a surrounding environment image Fc. When displayed article is an instrument panel of a vehicle, the environment surrounding the display device 25 includes, not only the environment within the vehicle, but also the environment outside of the vehicle.

The image processing device 10 includes an attribute information storage device 11, a viewpoint information processor 12, an environment information processor 13, and a display image generator 14.

The attribute information storage device 11 stores attribute information Ja pertaining to each of the plurality of objects.

The viewpoint information processor 12 generates viewpoint information Gb representing the position and motion of the viewpoint of the observer based on the observer image Fb outputted from the observer imaging device 22.

The environment information processor 13 generates surrounding environment information Gc representing the optical environment of the surroundings based on the surrounding environment image Fc outputted from the surrounding environment imaging device 23.

The display image generator 14 generates images of the objects, based on the attribute information Ja stored in the attribute information storage device 11, the state information Fa acquired by the state information acquiring device 21, the viewpoint information Gb generated by the viewpoint information processor 12, and the surrounding environment information Gc generated by the environment information processor 13, and combines the images of the plurality of objects to generate a display image.

The display image generator 14 includes a layer image generator 15 and a layer image combiner 16.

The layer image generator 15 generates a plurality of layer images based on the attribute information Ja, the state information Fa, the viewpoint information Gb, and the surrounding environment information Gc.

The layer image generator 15 treats each of the plurality of objects as belonging to a layer at the same depthwise position as the particular object, and generates a plurality of layer images each comprising images of one or more objects belonging to each layer.

The layer image of each layer is an image obtained by projecting the objects belonging to the particular layer onto the virtual projection plane.

Where each object is represented by a set of pixels, the image of the object is generated by defining the pixel values of the pixels of the object, and the image of the layer is generated by integrating the images of the one or more objects belonging to the layer. For example, a set of memory planes are provided for each layer, and the image of the layer is generated by writing, in the memory planes, the pixel values of the pixels of the objects belonging to the layer.

The layer image of each layer is generated by referring to the attribute information pertaining to the objects belonging to the layer, among the attribute information Ja stored in the attribute information storage device 11, together with the state information Fa, the viewpoint information Gb and the surrounding environment information Gc mentioned above.

The layer image combiner 16 generates the display image by combining the plurality of layer images.

In the combining, the layer image combiner 16 performs a process of giving a motion parallax and a process of hidden surface removal, on the plurality of layer images.

In the process of giving a motion parallax, a larger motion parallax is given to an object belonging to a layer situated on a deeper side.

In the process of hidden surface removal, an object belonging to a layer on a deeper side overlapping another object belonging to a layer on a front side is removed.

Figure 2:
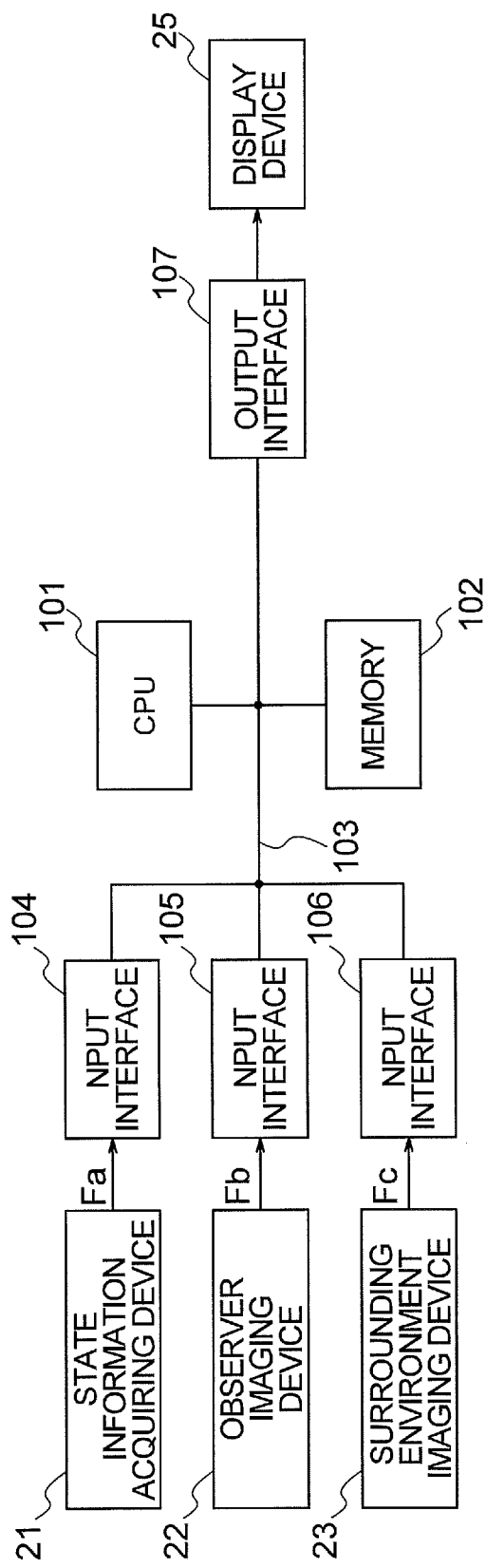
FIG. 2 is a block diagram showing an image display ECU constituting an image processing device in FIG. 1.

For example, the image processing device 10 is formed of an image display ECU (Electronic Control Unit) shown in FIG. 2.

The image display ECU shown in FIG. 2 includes a CPU 101 and a memory 102, which are interconnected by a bus 103. The CPU 101 and the memory 102 are also connected via the bus 103, further via input interfaces 104, 105 and 106, respectively, to the state information acquiring device 21, the observer imaging device 22, and the surrounding environment imaging device 23, and also connected via the bus 103 and an output interface 107 to the display device 25.

The CPU 101 operates according to the program stored in the memory 102, to realize the functions of the viewpoint information processor 12, the environment information processor 13, and the display image generator 14 shown in FIG. 1.

In addition to storing the above-mentioned program, the memory 102 also serves as the attribute information storage device 11 in FIG. 1, and as memories 12m, 13m, 15m which will be described later.

The operation of each part will now be described in further detail, for a case in which the information display apparatus 2 displays an instrument panel of a vehicle.

In this case, the state information acquiring device 21 acquires the vehicle information Fa, and supplies it to the layer image generator 15.

Generally, the vehicle information Fa includes information indicating the rotational speed of the engine, information indicating the travel speed of the vehicle, information indicating the temperature of the cooling water, information indicating the travelled distance, information indicating the useable fuel level, and information indicating the operating state of the direction indicator. The state information acquiring device 21 acquires these items of information from a control ECU for controlling the respective parts of the vehicle, via a CAN (Control Area Network), at a predetermined time interval.

In the following example, it is assumed that, among the above-mentioned items of information, the information indicating the rotational speed of the engine, the information indicating the travel speed of the vehicle, and the information indicating the operating state of the direction indicator are supplied to the layer image generator 15.

Figure 3:
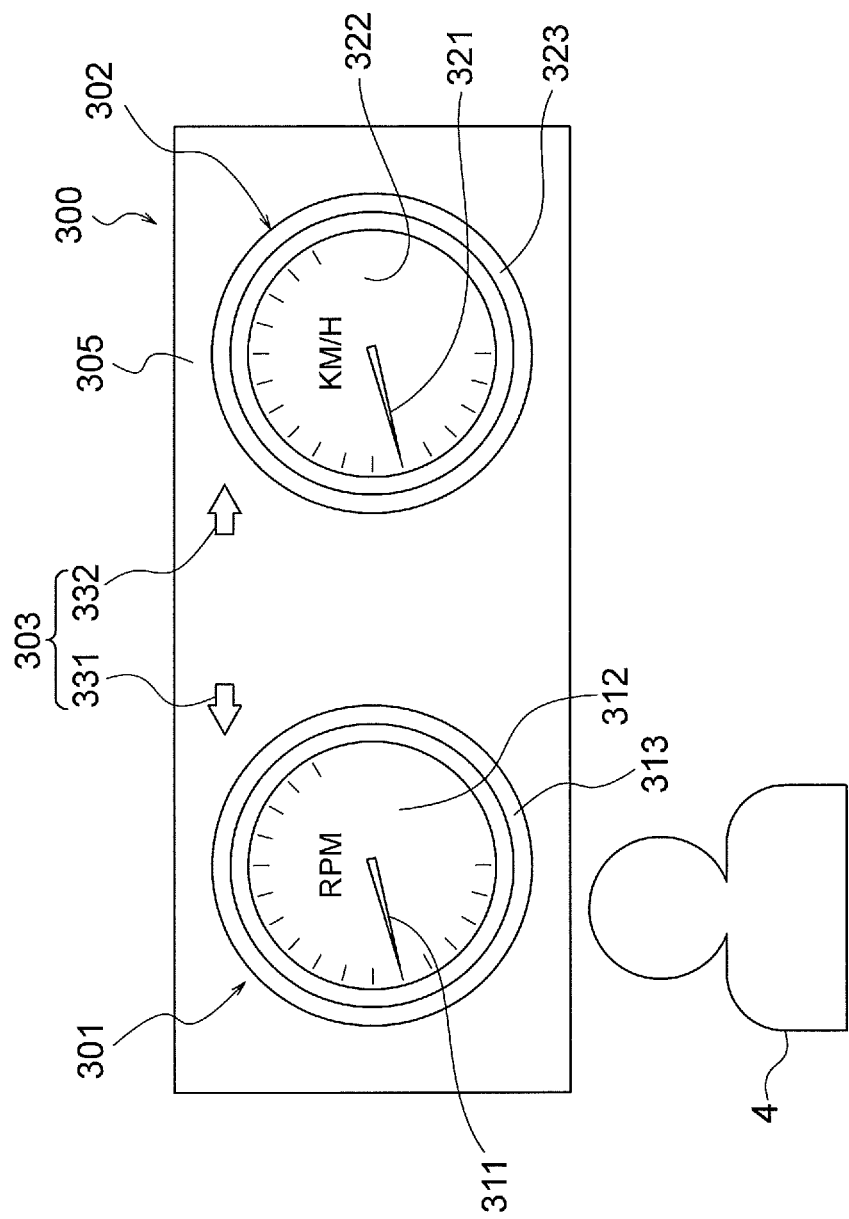
FIG. 3 is a front view showing an example of an instrument panel represented by an image displayed by a display device.
Figure 4:
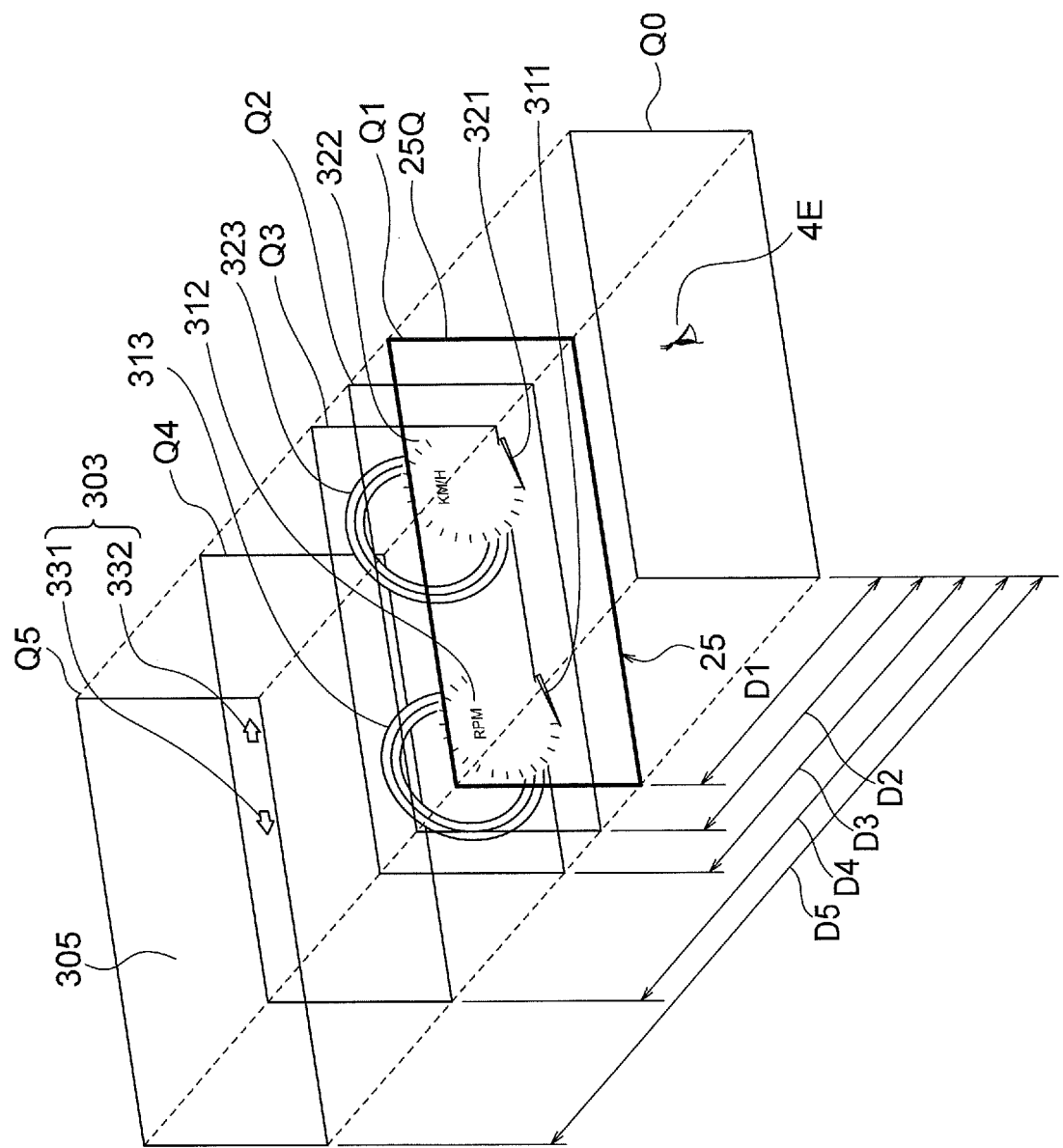
FIG. 4 is an exploded perspective view of the instrument panel in FIG. 3.

An example of an instrument panel represented by an image displayed by the display device 25 is shown in FIG. 3 and FIG. 4.

FIG. 3 is a front view of the instrument panel, and FIG. 4 is an exploded perspective view showing the constituent parts of the instrument panel. In FIG. 3, in addition to the instrument panel, an observer 4 watching the instrument panel is also shown. In FIG. 4, in addition to the instrument panel, a viewpoint 4E of the observer 4 is also shown.

The illustrated instrument panel 300 includes two instruments 301, 302 and an indicator 303.

The instrument 301 on the left side is a tachometer indicating the rotational speed of the engine. Specifically, the rotational position of a pointer 311 is changed in accordance with the information indicating the rotational speed of the engine acquired by the state information acquiring device 21. The instrument 301 includes, in addition to the pointer 311, a dial 312 and a ring 313.

The instrument 302 on the right side is a speedometer indicating the travel speed of the vehicle. Specifically, the rotational position of a pointer 321 is changed in accordance with the information indicating the travel speed of the vehicle acquired by the state information acquiring device 21. The instrument 302 includes, in addition to the pointer 321, a dial 322 and a ring 323.

The indicator 303 includes a pair of arrow-shaped indicator lights 331 and 332, and indicates the state of the direction indicator, not shown (provided outside of the vehicle, and used for signaling to other vehicles or the like).

The direction indicator is made to flash responsive to the operation by the driver. When the direction indicator flashes, the indicator 303 alternates between a high luminance state and a low luminance state in time with the flashing of the direction indicator.

The instruments 301 and 302, and the indicator 303 are provided on a dashboard 305.

When such an instrument panel 300 is displayed by the display device 25, the pointers 311, 321, the dials 312, 322, the rings 313, 323, the indicator 303, and the dashboard 305 are the constituent parts of the displayed article. That is, the displayed article includes not only the main displayed subject (instrument panel), but also its background (dashboard).

The surfaces (visible surfaces) of these constituent parts which are visible from the observer 4 are situated at different depthwise positions (positions with different distances from the reference plane Q0 which includes the viewpoint 4E and is parallel with the display screen 25Q of the display device 25), as shown in FIG. 4.

In the illustrated example, the visible surfaces of the pointers 311, 321 are at the position of a distance D1 from the reference plane Q0, the visible surfaces of the dials 312, 322 are at the position of a distance D2 from the reference plane Q0, the visible surfaces of the rings 313, 323 are at the position of a distance D3 from the reference plane Q0, the visible surface of the indicator 303 is at the position of a distance D4 from the reference plane Q0, and the visible surface of the dashboard 305 is at the position of a distance D5 from the reference plane Q0.

In FIG. 4, planes at the positions of the distances D1 to D5, respectively, from the reference plane Q0 are denoted by reference characters Q1 to Q5.

These visible surfaces may be inclined with respect to the reference plane Q0, or may include a portion protruding toward the reference plane Q0, or a portion recessed away from the reference plane Q0, so that the distance (D1 to D5) is indicated by a representative value. As the representative value, an average value, a median, or a value pertaining to the main part may be used.

The information display apparatus 2 of the present embodiment generates the display image using objects corresponding to the visible surfaces.

Figure 5:
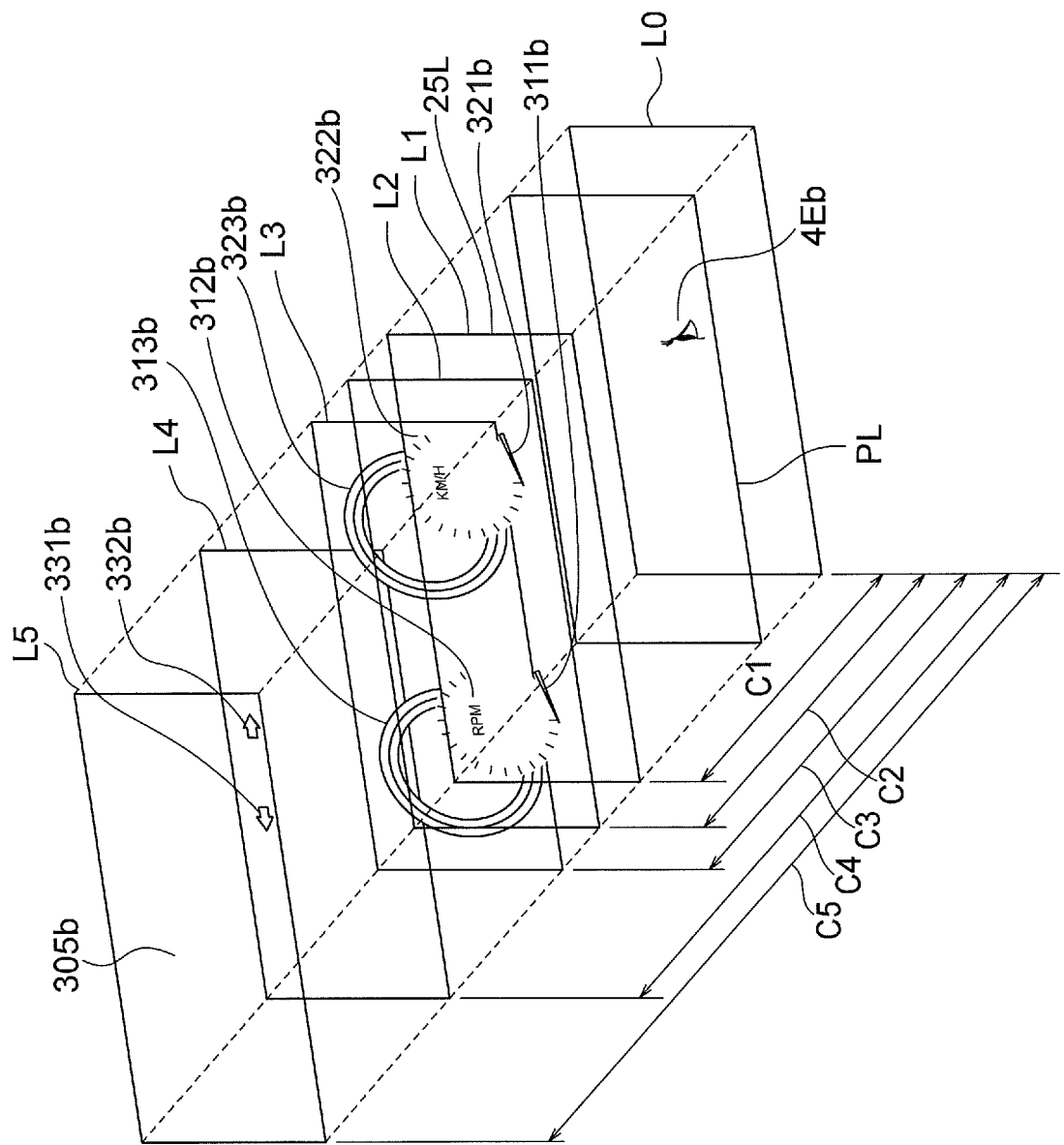
FIG. 5 is a diagram showing objects used for generating the image representing the instrument panel shown in FIG. 3 and FIG. 4.

FIG. 5 shows objects corresponding to the visible surfaces of the above-mentioned constituent parts shown in FIG. 3 and FIG. 4. Each object is denoted by the same reference characters, except for the addition of "b", as the constituent part having the corresponding visible surface.

The objects are disposed in the virtual space, in parallel with the plane (virtual display screen) 25L within the virtual space, corresponding to the display screen 25Q of the display device 25 in the real space, and at depthwise positions corresponding to the depthwise positions of the respectively corresponding visible surfaces (visible surfaces of the constituent parts, i.e., the pointers, the dials, the rings, the indicator, and the background).

Here, the depthwise positions pertaining to the objects are defined as distances (depthwise distances in the virtual space) C1 to C5 in the virtual space from the reference plane L0 which includes the viewpoint 4Eb and is parallel with the virtual display screen 25L.

The depthwise positions pertaining to the visible surfaces of the constituent parts of the displayed article are defined as the distances (depthwise distances in the real space) D1 to D5 from the reference plane Q0 including the viewpoint 4E to the visible surfaces, when the displayed article is hypothetically placed at a position in front of the observer 4, i.e., at the position of the display device 25, as mentioned above. In this case, it is imagined, for example, that the displayed article is disposed such that the depthwise position of one or more of the visible surfaces of the constituent parts of the displayed article, for example, the visible surface or surfaces closest to the reference plane Q0 (the visible surfaces of the pointers 311, 321) coincides with the position of the display screen 25Q of the display device 25.

Since the viewpoint 4E may move forward or backward with respect to (toward or away from) the display screen 25Q, the distance from the display screen 25Q to the reference plane Q0 including the viewpoint 4E may change. As the distance from the display screen 25Q to the reference plane Q0, a value obtained by measurement may be used, or a standard value determined based on experience may be used. For example, in a case where the distance varies, a median or an average value may be used as the standard value. Here, description will be made on a case in which a standard value determined based on experience is used. Description on a case in which a distance obtained by measurement will be given later.

Even when a standard value is used, as will be described later, in a case where the brightness of the displayed image is changed in response to the forward or backward motion of the viewpoint 4E, the forward or backward motion may be detected, and the brightness of the displayed image may be changed based on the detected motion (change in the position).

The depthwise distances C1 to C5 are determined based on the depthwise distances D1 to D5 determined in the manner described above. It is desirable that the distance C1 to C5 are determined to be identical to the distances D1 to D5. However, this does not impose any restriction to the present invention. It is sufficient if the distances C1 to C5 have a certain similarity, such as a proportional relation or the same magnitude relation, with the distances D1 to D5.

Each of the above-mentioned objects is treated as belonging to a layer at the same depthwise position as the particular object. When there are a plurality of objects at the same depthwise position, they are treated as belonging to the same layer. In the illustrated example, it is so treated that the objects 311$b$ and 321$b$ belong to a first layer L1, the objects 312$b$ and 322$b$ belong to a second layer L2, the objects 313$b$ and 323$b$ belong to a third layer L3, the objects 331$b$ and 332$b$ belong to a fourth layer L4, and the object 305$b$ belongs to a fifth layer L5.

The attribute information storage device 11 stores the attribute information Ja pertaining to each of the above-mentioned objects, which is supplied in advance from the outside.

The attribute information Ja includes shape information Jb, texture information Jc, and depth information Jd.

The shape information Jb pertaining to each object represents the shape of the corresponding visible surface of the constituent part of the displayed article, as seen from the viewpoint 4E, when the displayed article is hypothetically disposed at the position of the display device 25.

The texture information Jc pertaining to each object represents texture of the corresponding visible surface of the constituent part of the displayed article hypothetically disposed at the position of the display device 25, and includes object color information Je, specular reflection information Jf, and normal information Jg.

The object color information Je pertaining to each object represents the color of the corresponding visible surface of the constituent part. The color as referred herein is the color (that is, the spectral reflectance) of the color of the article itself, ignoring the effects of reflection and shading.

Where the object is represented by a set of pixels, the object color information Je is represented by pixel values indicating the object color, e.g., R, G, B component values, pertaining to each pixel.

If the entirety of the visible surface of the constituent part has a uniform object color, the pixel values of all the pixels of the object are the same. If the visible surface of the constituent part has a pattern, the pixel values differ depending on the position within the object.

The specular reflection information Jf pertaining to each object represents the degree of specular reflection (luster) of the corresponding visible surface of the constituent part.

When the object is represented by a set of pixels, the specular reflection information Jf is represented by a pixel value indicating the degree of luster pertaining to each pixel. This pixel value is, for example, a value within a range of from 0 to 255. For example, when the luster is the strongest, and the degree of the specular reflection is the largest, the pixel value representing the specular reflection information Jf is set to "255". For expressing a matt (matt-finished) surface, having been surface-treated a little, the specular reflection information Jf is made to have an intermediate value throughout.

The normal information Jg pertaining to each object represents the normal direction to the corresponding visible surface of the constituent part of the displayed article hypothetically disposed at the position of the display device 25.

For example, the normal direction is defined with respect to the direction of a normal to the reference plane Q0.

The normal direction is represented, for example, by a three-dimensional vector. The three-dimensional vector is represented by a combination of three components.

Where the object is represented by a set of pixels, the normal information is represented by a combination of three pixel values indicating the normal direction pertaining to each pixel.

Where the normal information of the object is represented in the format of color image data consisting of R, G, B component values, the three components X, Y, Z of the three-dimensional vector may be expressed by being assigned to R, G, B channels, respectively. If each component value is a value within a range of 0 to 255, the value 0 to 127 may be used to express a negative value, and the value 128 to 255 may be used to express a positive value.

The reason why the planar object is made to have the normal information Jg, as mentioned herein, is to faithfully reproduce the reflection of light on the visible surface of the displayed article. In the calculations of the reflection and the like based on the normal information Jg, it is assumed that the surface of the planar object has inclination corresponding to the normal information Jg for each pixel.

Figure 6A:
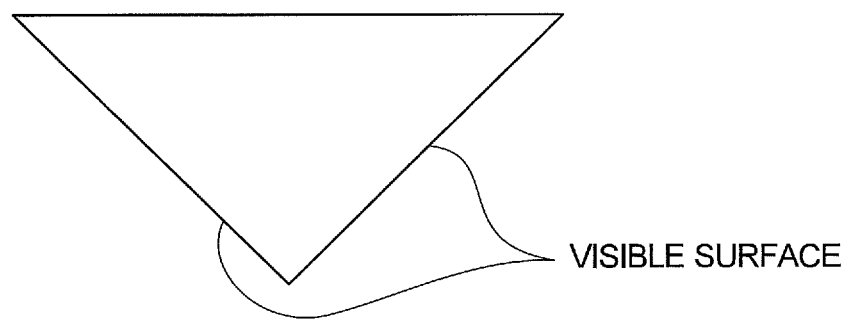
FIGS. 6(a) and 6(b) are diagrams showing an example of a visible surface corresponding to a planar object, and normal information.
Figure 6B:
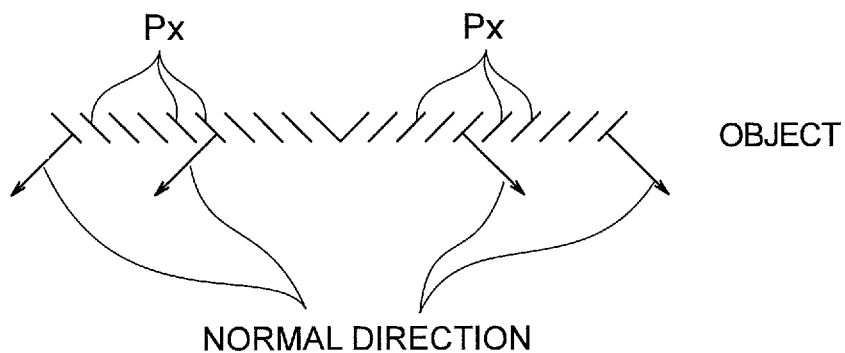

For example, if the visible surface is inclined in different directions between the left half and the right half, as shown in FIG. 6(a), the normal information for the group of pixels Px corresponding to the left half of the visible surface, and the normal information for the group of pixels Px corresponding to the right half of the visible surface indicate different normal directions, as shown in FIG. 6(b).

The depth information Jd pertaining to each of the objects represents the depthwise position of the particular object.

As explained above, the depthwise position of each object corresponds to the depthwise position of the visible surface of the constituent part corresponding to the particular object when the displayed article is hypothetically disposed at the position of the display device 25.

Also, each object is treated as belonging to a layer imagined to be present at the depthwise position of the particular object.

In this case, a combination of the depth information Jd pertaining to each layer, and the information indicating the layer to which the particular object belongs may be used in place of the depth information of the particular object.

In such a case, information representing the distances C1 to C5 from the reference plane L0 to the layers L1 to L5, and information indicating the layer to which each object belongs are stored in the attribute information storage device 11.

Also, the shape information Jb and the texture information Jc pertaining to the one or more objects belonging to each layer are collectively treated as information of the particular layer.

Figure 7A:
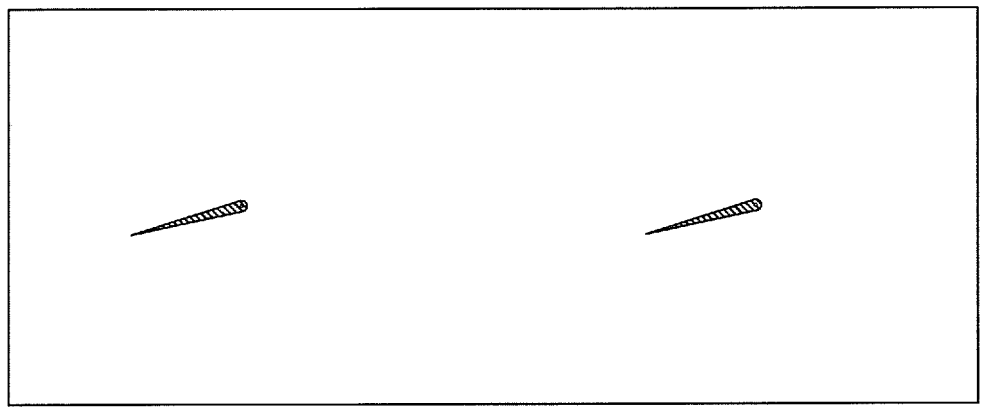
FIGS. 7(a) to 7(c) are diagrams showing object color information, specular reflection information, and normal information pertaining to a layer.
Figure 7B:
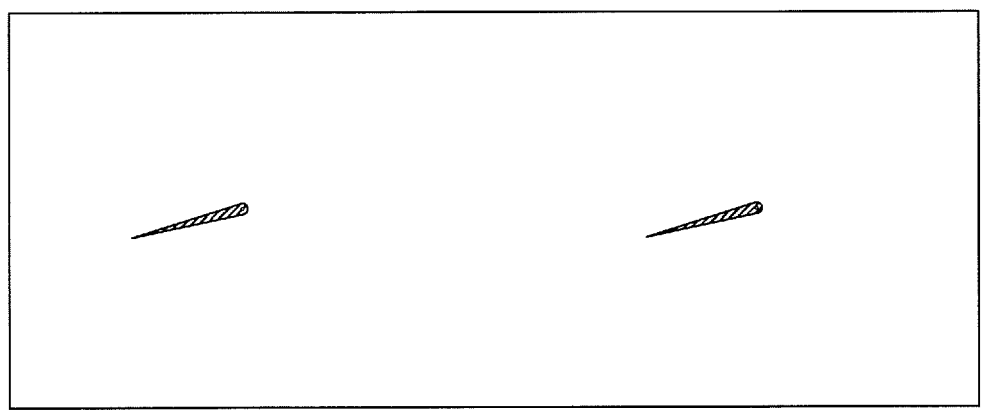
Figure 7C:
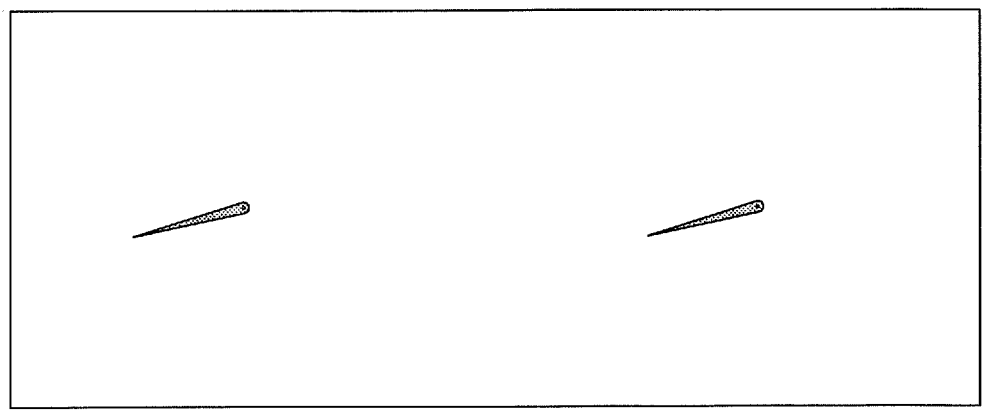
Figure 8A:
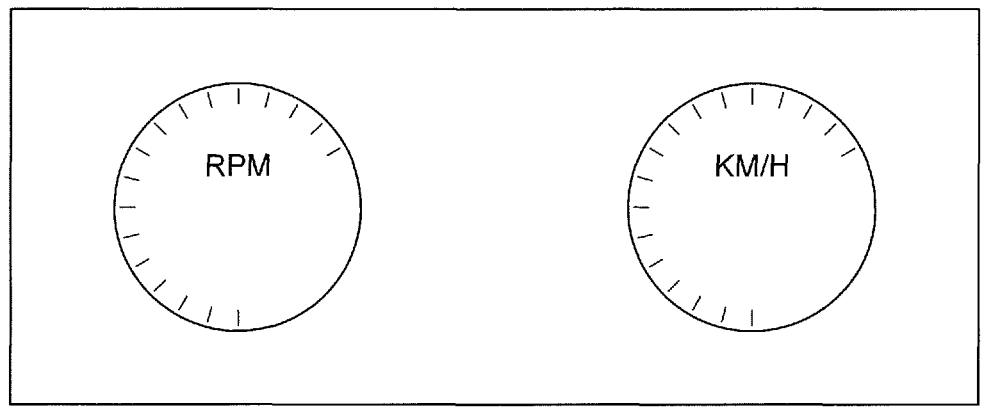
FIGS. 8(a) to 8(c) are diagrams showing object color information, specular reflection information, and normal information pertaining to another layer.
Figure 8B:
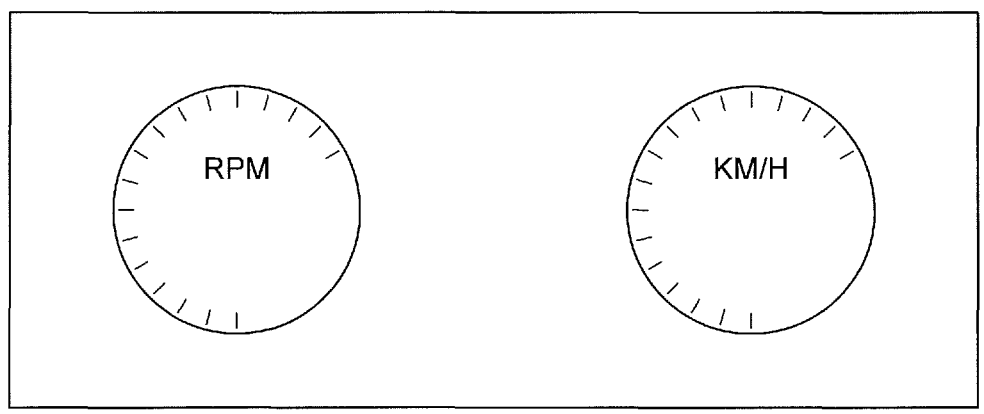
Figure 8C:
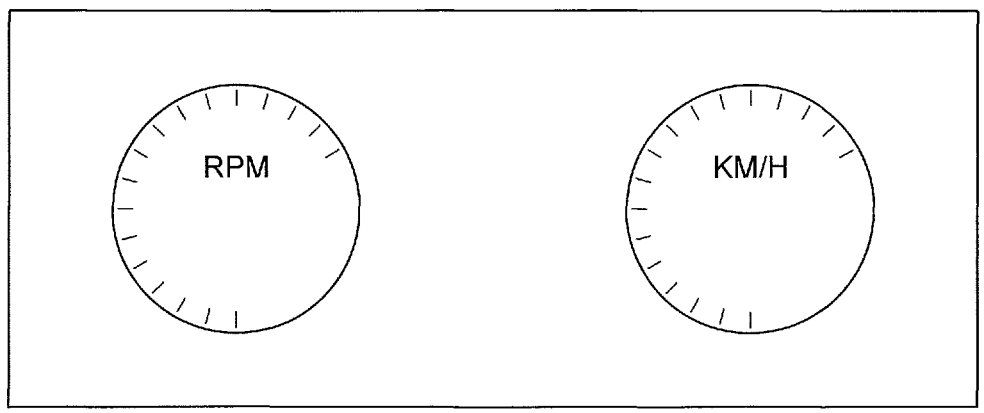
Figure 9A:
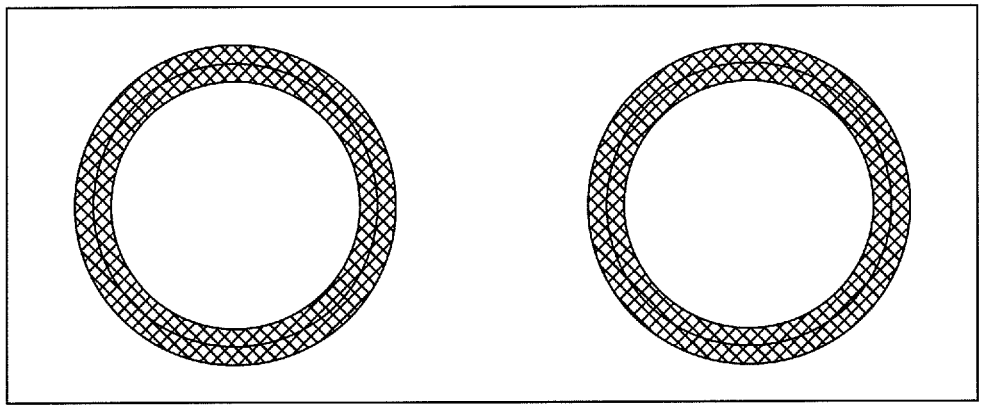
FIGS. 9(a) to 9(c) are diagrams showing object color information, specular reflection information, and normal information pertaining to still another layer.
Figure 9B:
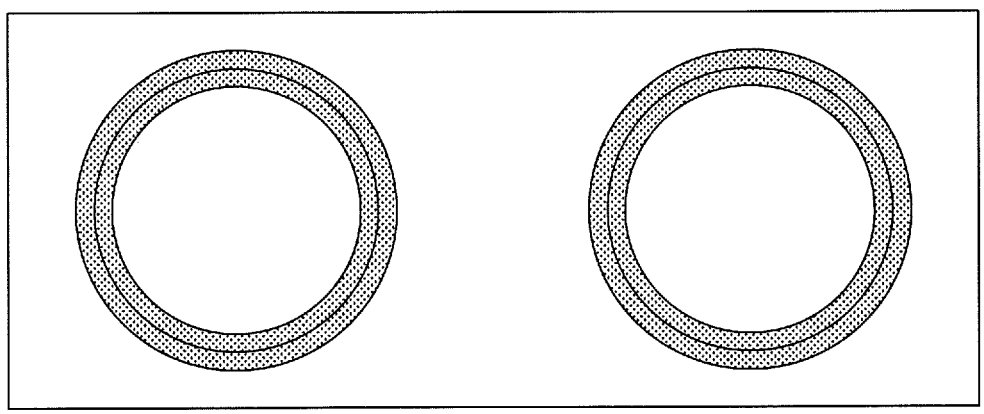
Figure 9C:
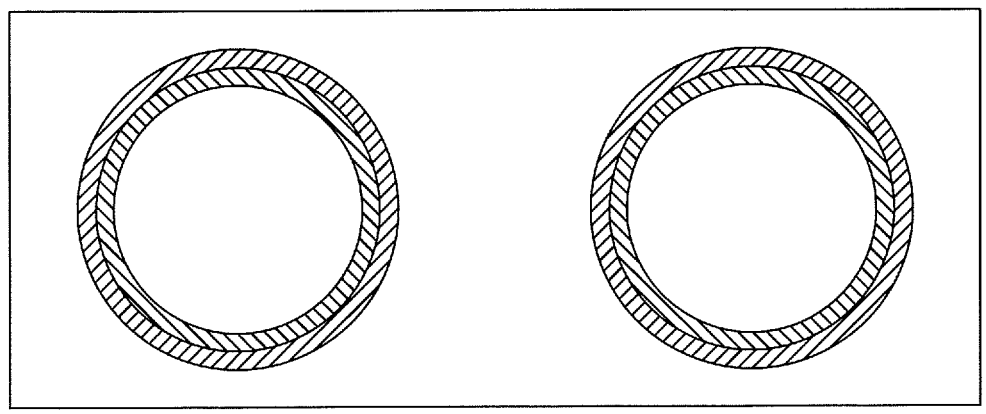

FIG. 7 to FIG. 9 illustrate the object color information Je, the specular reflection information Jf, and the normal information Jg pertaining to the layers L1, L2, and L3, among the layers L1 to L5, as information for each layer, i.e., information mapped to the respective pixels in each layer.

The observer imaging device 22 captures the image of the observer 4 (particularly the head of the observer) observing the display device 25, and outputs the captured image as the observer image Fb.

The observer imaging device 22 includes an image sensing device (camera), captures the image frame by frame, and successively outputs the images of the respective frames.

For example, the observer imaging device 22 is installed on the top of the display device 25, as shown in FIGS. 10(a) to 10(d).

The viewpoint information processor 12 detects the position of the viewpoint of the observer from the observer image Fb outputted from the observer imaging device 22, and generates the information (viewpoint information) Gb representing the position and motion of the viewpoint.

The viewpoint information processor 12 may recognize an eye in the observer image Fb outputted from the observer imaging device 22, and regard the position of the recognized eye as the position of the viewpoint. Alternatively, it may recognize the head in the observer image Fb, and regard the position of the head as the position of the viewpoint. What is essential is to detect the position of an eye, or a position of a part of the observer close to an eye. In the following description, it is assumed that the head is recognized, and the position of the head is detected as the position of the viewpoint. Because the position of the head is treated as the position of the viewpoint, the head of the observer 4 is denoted by reference characters 4E in FIGS. 10(a) to 10(d).

The viewpoint information processor 12 tracks the motion of the viewpoint 4E based on information (viewpoint position information) indicating the detected position of the viewpoint, and generates motion information representing the motion of the viewpoint 4E. As this motion information, for example, information representing the direction of the movement and a quantity of the movement is generated.

The information representing the position of the viewpoint may be information representing a relative position. For example, information representing the position relative to a reference position may be generated by taking, as the reference position, the position of the head of the observer 4 at the time when the head is first recognized by the viewpoint information processor 12 and accumulating the subsequent motion.

Figure 10B:
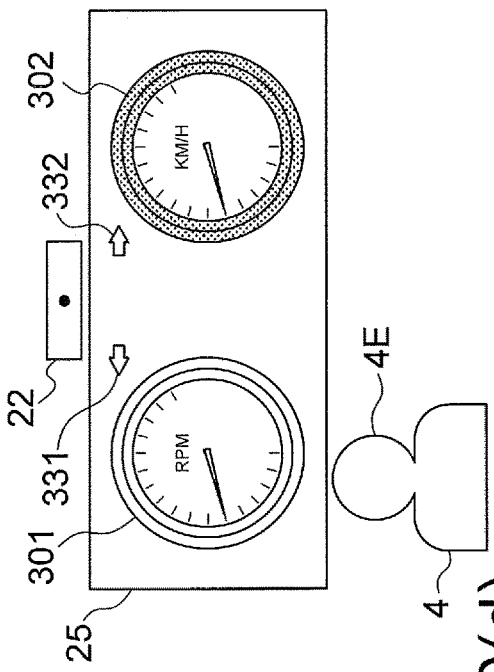
FIGS. 10(a) to 10(d) are schematic diagrams showing an example of a change of a displayed image in response to movement of a viewpoint of an observer.
Figure 10D:
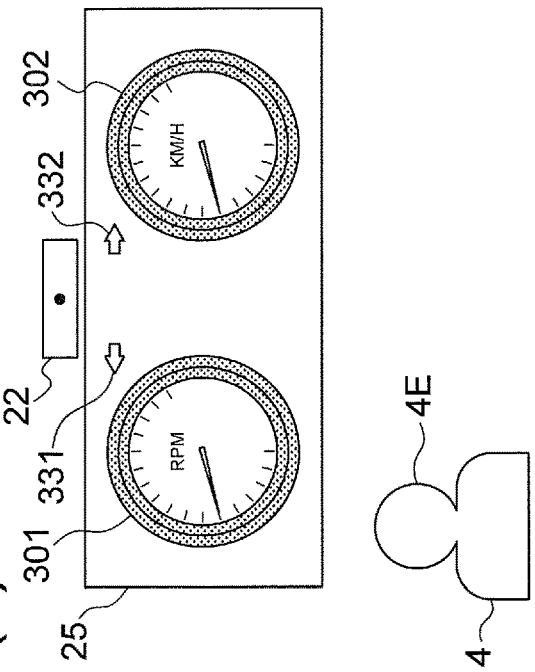
Figure 10A:
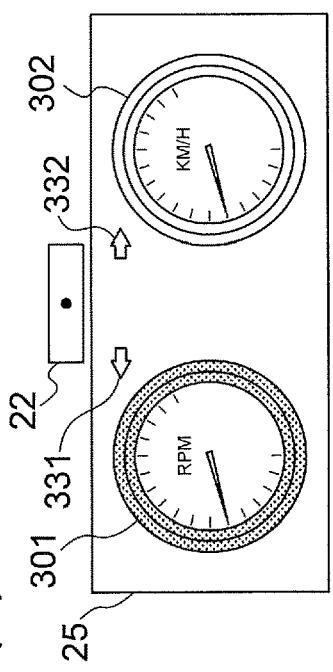

FIG. 10(a) shows a state in which the viewpoint 4E directly confronts the instrument on the right side of the instrument panel displayed by the display device 25, while FIG. 10(b) shows a state in which the viewpoint 4E directly confronts the instrument on the left side of the instrument panel displayed by the display device 25.

Figure 10C:
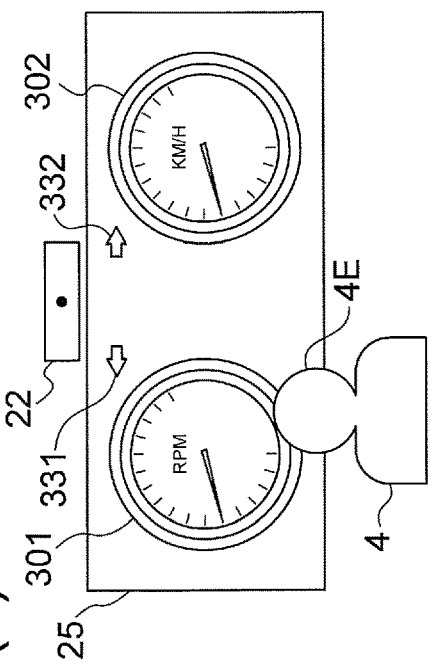

FIG. 10(c) shows a state in which the viewpoint 4E is close to the display device 25, and FIG. 10(d) shows a state in which the viewpoint 4E is far away from the display device 25.

The motion of the viewpoint 4E in the horizontal or vertical direction can be detected based on changes in the position of the head recognized in the observer image.

With regard to the direction of the forward or backward motion (motion in the depthwise direction), it can be determined that the motion is forward (in the direction of approaching) if the area of the recognized head is increased with time, whereas it can be determined that the motion is backward (in the direction of moving away) if the area of the recognized head is decreased with time.

It is also sufficient if a relative quantity is obtained with regard to the quantity of the forward or backward movement of the viewpoint 4E. For example, if the area of the head is represented by the number of pixels, the quantity of movement per pixel may be defined in advance, and the quantity of movement toward or away from the observer may be determined based on the number of pixels by which the area has been increased or decreased.

Instead of the area of the head in the observer image, a distance between specific parts (feature points) in the head in the observer, image may be used for the determination on the forward or backward motion.

The viewpoint information processor 12 supplies the motion information generated in the manner described above to the layer image generator 15.

The viewpoint information processor 12 may perform inter-frame interpolation of the viewpoint position information to generate information with a higher frame rate. That is, the viewpoint information processor 12, which generates the viewpoint information Gb for each frame from the observer image Fb for each frame outputted from the observer imaging device 22, may perform inter-frame interpolation on the viewpoint position information included in the viewpoint information for each frame, thereby to generate the viewpoint position information with a higher frame rate. By generating the motion information from the viewpoint position information with a higher frame rate, it is possible to generate the motion information which smoothly expresses the motion of the viewpoint 4E.

The surrounding environment imaging device 23 captures the image of the environment surrounding the display device 25, and outputs the captured image as the surrounding environment image Fc. The surrounding environment imaging device 23 captures the image frame by frame, and successively outputs the images of the respective frames. The surrounding environment imaging device 23 comprises an image sensing device having a wide imaging angle, such as a spherical camera, a hemispherical camera, or a wide-angle camera. The surrounding environment imaging device 23 may comprise a combination of two or more image sensing devices.

The "surrounding environment" as meant herein includes people, things, and scenery around the display device 25 within the vehicle and outside of the vehicle. The "people" as meant herein include the observer him/herself, other passengers, pedestrians outside of the vehicle, and the like. The "things" as meant herein include interior lights, the sun, and street lights, as well as head lights, tail lights and the like of other vehicles.

The environment information processor 13 generates the surrounding environment information Gc based on the surrounding environment image Fc outputted from the surrounding environment imaging device 23, and stores the surrounding environment information Gc in the internal memory 13m.

The environment information processor 13 acquires information pertaining to the people, things, and scenery that are included in the surrounding environment image Fc, and that would be reflected on the visible surfaces of the constituent parts of the displayed article by a relatively large degree, i.e., that would cause changes in the luminance or color of the visible surfaces by a relatively large degree, when the displayed article, e.g., the instrument panel, is imagined to actually exist at the position of the display device 25.

The surrounding environment information Gc may be information representing the intensity and color of light for each direction. For example, it may be information indicating that there is a light source emitting light with a large intensity and a specific color, in a specific direction.

In order that the change in the environment during travel of the vehicle at a high speed is reflected in the displayed image without delay, it is desirable that the surrounding environment information Gc is obtained with a frame rate giving the observer a feeling of smoothness in the change of the image displayed on the display device 25.

On the other hand, when the travel speed of the vehicle is low, or there are but few changes in the surrounding environment, or when the visible surfaces of the constituent parts of the displayed article are matt (matt-finished), resulting in few reflections, the surrounding environment information Gc may be obtained, by decimating frame-by-frame data (e.g., extracting data once every few frames, or once every few seconds). In this case, the generated surrounding environment information Gc is stored in the memory 13m in the environment information processor 13, and repeatedly read out and used.

In order to improve the visibility of the reflections of the people, things and scenery in the surrounding environment image Fc, the environment information processor 13 may perform a process of correcting the surrounding environment information Gc, such as a process of correcting the color or a process of increasing the resolution of the image (reflected image) represented by the surrounding environment information Gc, before supplying the surrounding environment information Gc to the layer image generator 15.

The layer image generator 15 generates the layer image for each of a plurality of layers. The layer image of each layer is an image obtained by projecting the object(s) belonging to the above-mentioned each layer onto the virtual projection plane PL.

The layer image generator 15 disposes the object(s) having a shape and texture represented by the shape information Jb and the texture information Jc stored in the attribute information storage device 11, at a depthwise position represented by the depth information (the depth information of the layer to which the above-mentioned object(s) belong) Jd also stored in the attribute information storage device 11, and projects the thus-disposed object(s) onto the virtual projection plane PL.

The layer image generator 15 receives the shape information Jb, the texture information Jc, and the depth information Jd stored in the attribute information storage device 11, the vehicle information Fa acquired by the state information acquiring device 21, the viewpoint information Gb provided by the viewpoint information processor 12, and the surrounding environment information Gc provided by the environment information processor 13, and generates the image of each layer. That is, it generates images of the one or more objects belonging to each layer, integrates the generated images of the one or more objects, and outputs the resultant image as the layer image of the particular layer.

In generating the image of each object, the state of the instrument panel displayed based on the vehicle information Fa (the rotational position of the object 311b, 321b corresponding to the pointer 311, 321 of the instrument 301, 302, and the luminance of the object 331b, 332b corresponding to the indicator light 331, 332 of the indicator 303) is determined.

When each object is expressed by a set of pixels, the layer image generator 15 determines the pixel values (color component values, luminance value and the like) of each pixel, in the generation of the image of each object.

In this case, if there is a pattern, or there is a reflection on the visible surface of the constituent part (that is, it is determined that the reflection should be expressed based on the texture information Jc read from the attribute information storage device 11 and the surrounding environment information Gc generated by the environment information processor 13), the pattern or the reflection is also expressed. Also, when the luminance, color or the like should be changed in response to the position of the viewpoint 4E (represented by the viewpoint information Gb), such a change should also be made.

In the generation of the image of each object, the texture of the visible surface of the constituent part corresponding to the particular object is expressed by performing the bump mapping on the particular object, based on the texture information Jc.

The calculations concerning the optical reflection can be made by selecting the reflection model, such as the Phong model, the Torrance-Sparrow model, the Blinn model, or the like, that is suitable for the material of the visible surface of the constituent part corresponding to the object.

It is known that the movement of the viewpoint 4E causes changes in the brightness of the displayed article, or movement of a bright part (highlight part). For example, it is known that the movement of the viewpoint 4E in the vertical or horizontal direction (the movement in a direction parallel to the reference plane Q0) causes movement of a bright part (particularly, the highlight part) in the same direction, and the forward or backward movement (the movement of the viewpoint 4E in a direction perpendicular to the reference plane Q0) causes a change in the brightness of the displayed article. In the present embodiment, in order to reproduce such a phenomenon, images are generated by imagining a pseudo light source which is situated in the virtual space and moves along with the movement of the viewpoint 4Eb. For example, it is imagined that this pseudo light source is situated at the same position as the viewpoint 4Eb.

It is assumed here that the positions of the objects in the virtual space are fixed, and the pseudo light source moves following the motion of the viewpoint 4Eb.

Figure 11:
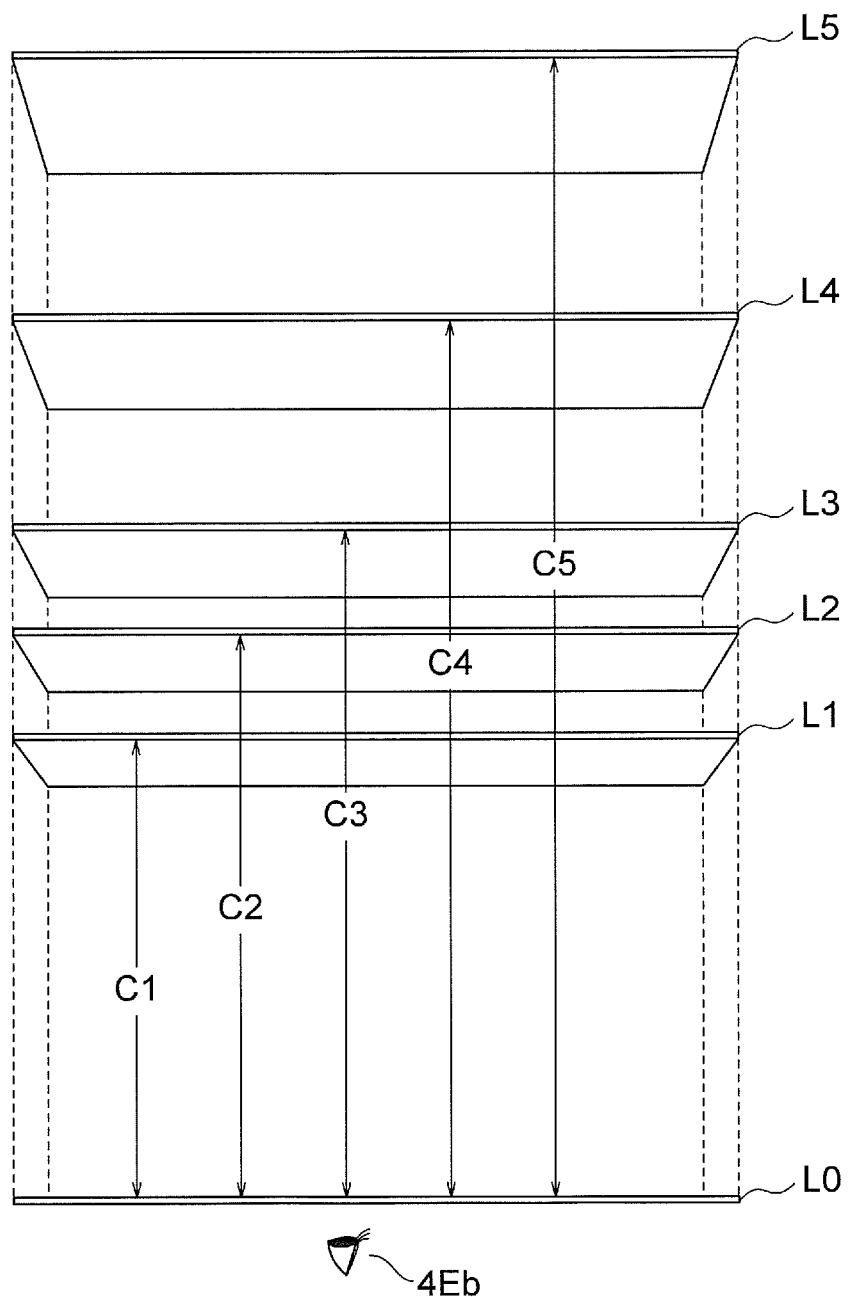
FIG. 11 is a diagram showing an example of disposition of objects and a pseudo light source in a virtual space.

For example, it is assumed that each object is disposed in one of the layers L1 to L5 shown in FIG. 11, the positions in the vertical and horizontal directions (the positions in the directions parallel to the reference plane L0) are unchanged, and the pseudo light source is at the same position as the viewpoint 4Eb, and moves together with the viewpoint 4Eb.

In response to the change in position of the pseudo light source, the layer image generator 15 changes the intensity of the surface-reflected light from the object, thereby to change the brightness of each part of the image. The process of changing the brightness is performed by changing the luminance. The surface of each object is assumed to have a normal direction defined for each pixel as exemplified in FIG. 6.

For example, if the viewpoint 4E moves rightward with respect to the display device 25 as shown in FIG. 10(a), the viewpoint 4Eb and the pseudo light source in the virtual space are moved similarly, thereby to change the surface reflection from the object, and move the bright part (highlight part) in the image rightward.

If the viewpoint 4E moves leftward with respect to the display device 25 as shown in FIG. 10(b), the viewpoint 4Eb and the pseudo light source in the virtual space are moved similarly, thereby to change the surface reflection from the object, and move the bright part (highlight part) in the image leftward.

If the viewpoint 4E approaches the display device 25 as shown in FIG. 10(c), the viewpoint 4Eb and the pseudo light source in the virtual space are moved similarly, thereby to increase the intensity of the surface reflection from the object, and increase the luminance of the image.

If the viewpoint 4E moves away from the display device 25 as shown in FIG. 10(d), the viewpoint 4Eb and the pseudo light source in the virtual space are moved similarly, thereby to decrease the intensity of the surface reflection from the object, and to decrease the luminance of the image.

Moreover, the layer image generator 15 decreases the intensity of light (the illuminance at the surface of each object) from the pseudo light source in the virtual space in accordance with the depthwise distance (C1 to C5) of each layer, thereby to adjust the brightness of the image of the object of each layer. The adjustment of the brightness is performed by adjusting the luminance. Here, it is assumed that the illuminance at each layer is inversely proportional to the square of the distance from the pseudo light source.

For example, if, in FIG. 11, the distance from the pseudo light source (situated at the same position as the viewpoint 4Eb) to the first layer L1 is C1 and the illuminance at the first layer L1 is E1, the illuminance E2 at the second layer L2 is calculated by:

$$E2=(C1/C2)^2 \times E1 \tag{1}$$

Similarly, the illuminance E3 at the third layer L3 is determined by:

$$E3=(C2/C3)^2 \times E2 \tag{2}$$

The illuminance at other layers is determined by similar calculations.

The brightness of the image(s) of the object(s) of each layer is determined to be of values in accordance with the illuminance thus calculated. By doing so, a sense of depth can be given to the image(s).

The intensity of the pseudo light source, and the spreading characteristics of the pseudo light source are assumed to be stored, as inherent parameters, in the memory 15m in the layer image generator 15.

As has been described above, the layer image generator 15 generates the image of each object by calculating the effects of the luster and shading, without using complicated, three-dimensional shape data. Because three-dimensional shape data is not used, the quantity of data required for the calculations can be made small.

The layer image combiner 16 generates the display image by superposing the layer images L1 to L5 generated by the layer image generator 15, in accordance with the depth information Jd. In the superposition, a process of giving a motion parallax and a process of hidden surface removal are performed.

The process of giving a motion parallax is performed in the following manner.

Figure 12:
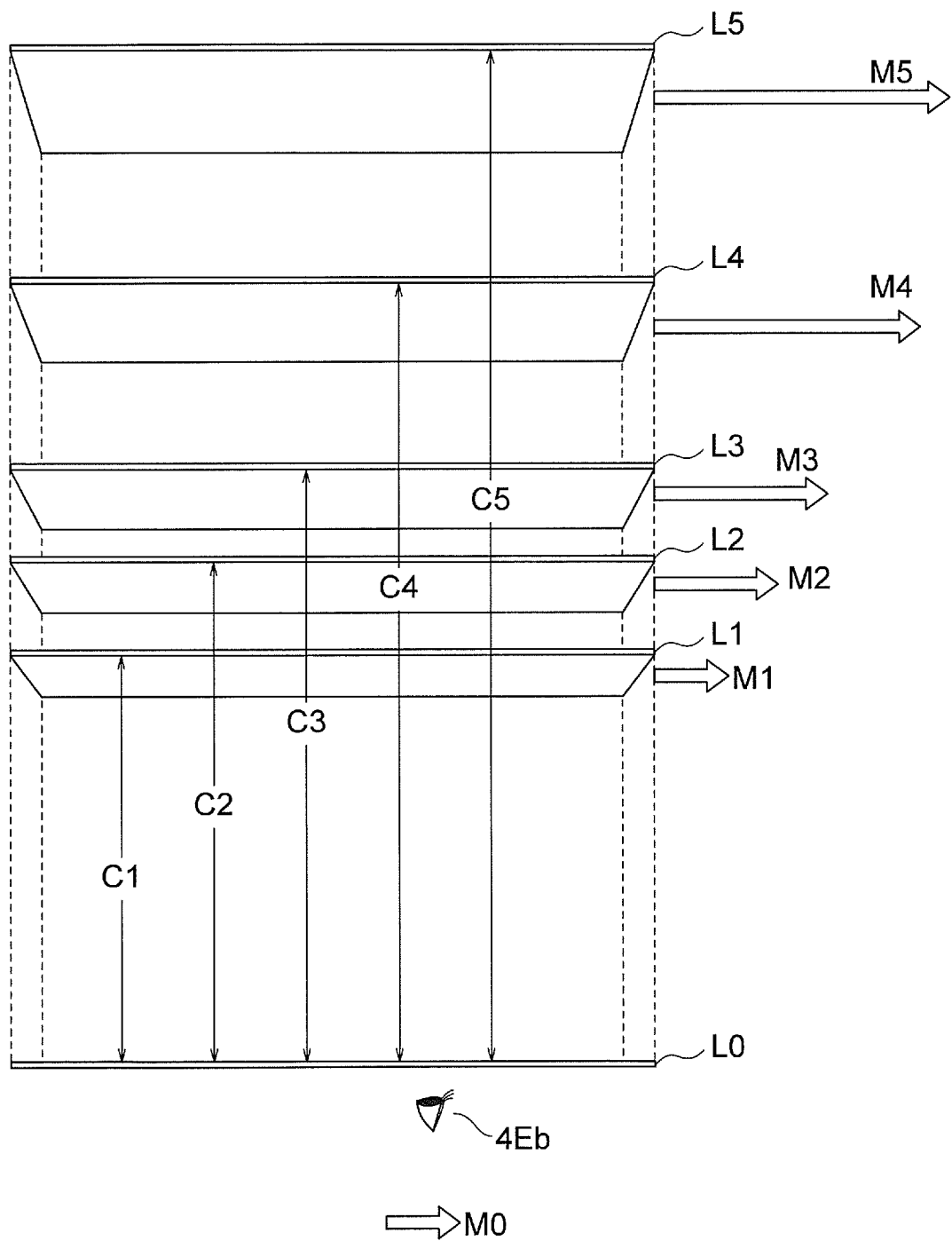
FIG. 12 is a diagram showing an example of movement of objects in response to movement of the viewpoint of the observer.

The distances from the reference plane L0 including the viewpoint 4Eb to the respective layers L1 to L5 in the virtual space are assumed to be C1 to C5, as shown in FIG. 12.

The motion parallax is expressed by moving the viewpoint 4Eb in the virtual space following the movement of the viewpoint 4E, and moving the object(s) in the same direction, following the movement of the viewpoint 4Eb. Here, the object farther from the viewpoint 4Eb is moved by a greater quantity. Specifically, the quantity of the movement of the object is made to be proportional to the distance from the viewpoint 4Eb.

The quantity of movement, Mj, of the object in the j-th layer (j being any of 1 to 5) is determined to be of a value given by the following equation, based on the quantity of the movement, M0, of the viewpoint 4Eb.

$$Mj = Cj \times M0 \times K \quad (3)$$

Here, K is a coefficient, which is determined, through experiments or the like, so as not to give odd feeling.

In the process of hidden surface removal, the object in each layer is removed if it overlaps another object in a layer in front of the particular layer.

The layer image combiner 16 generates the display image by moving the object(s) in each layer to give a motion parallax, then performing hidden surface removal and superposing the objects.

The display device 25 displays the display image generated by the layer image combiner 16.

Incidentally, when the position of the viewpoint in the observer image cannot be identified, the viewpoint information processor 12 outputs information (detection failure information) indicating to that effect; when the detection failure information is outputted, the layer image generator 15 performs the generation of the image(s) (the determination of the brightness of each part of the image(s), and the determination of the quantity of the movement to give a motion parallax) on the assumption that the viewpoint 4Eb is at a predefined position (predefined viewpoint position). For example, information indicating the predefined viewpoint position is stored in advance in the memory 15m in the layer image generator 15.

By sending the display image to the display device 25, the layer image combiner 16 updates the display image of the display device 25. It is desirable that the rate at which the display image is updated is, for example, 20 fps or higher so as to display the image which quickly responds to the motion of the viewpoint 4E, and changes smoothly with little delay.

When the rate at which the observer image Fb is acquired is low, and the observer feels the delay in the image display, the display image may be updated at a higher rate by predicting the motion of the viewpoint 4E, by the use of a Kalman filter or the like.

This prediction may be performed at the time of the generation of the layer images in the layer image generator 15, or at the time of the generation of the display image in the layer image combiner 16.

Figure 13:
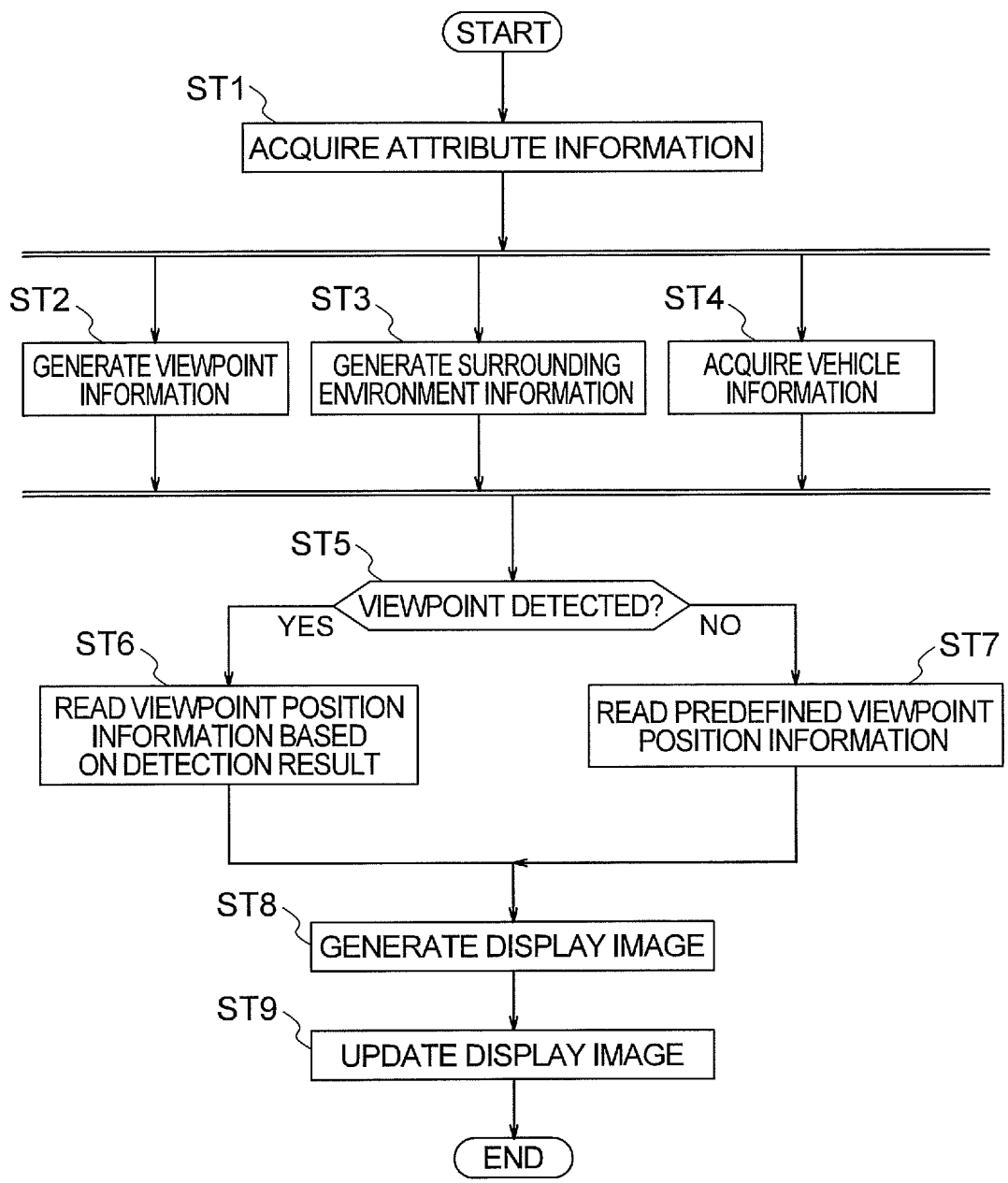
FIG. 13 is a flowchart showing a procedure of image processing in the image processing device in FIG. 1.

A procedure of the image processing by the above-described image processing device 10 will now be described with reference to the flowchart of FIG. 13.

First, in step ST1, the layer image generator 15 acquires the attribute information Ja pertaining to the objects corresponding to the constituent parts of the displayed article to be displayed by the display device 25. The attribute information Ja includes the shape information Jb, the texture information Jc and the depth information Jd.

Next, the processes in steps ST2, ST3, ST4 are performed in parallel.

In step ST2, the viewpoint information processor 12 generates the viewpoint information Gb from the observer image Fb.

That is, detection of the viewpoint (identification of the viewpoint position) in the observer image Fb is attempted, information indicating whether the viewpoint has been detected or not is preserved, and, when the viewpoint has been detected, information indicating the position of the detected viewpoint is stored in the internal memory 12m. Furthermore, the motion of the viewpoint is detected. In the motion detection, for example, if the viewpoint 4E is detected in two consecutive frames, the direction of the movement and the quantity of the movement are determined based on the difference between the positions of the viewpoint 4E, and stored, as the motion information, in the memory 12m.

In step ST3, the environment information processor 13 generates the surrounding environment information Gc from the surrounding environment image Fc obtained by the image capturing by the surrounding environment imaging device 23.

In step ST4, the layer image generator 15 acquires the vehicle information Fa from the state information acquiring device 21.

In step ST5, the viewpoint information processor 12 determines whether the information indicating that the viewpoint 4E has been detected by the process of step ST2 is preserved.

If the information indicating that the viewpoint 4E has been detected is preserved, the procedure proceeds to step ST6. Otherwise, the procedure proceeds to step ST7.

In step ST6, the layer image generator 15 reads the information indicating the position of the viewpoint detected in step ST2, from the memory 12m.

In step ST7, the information indicating the predefined viewpoint position which is stored in advance in the memory 15m in the layer image generator 15 is read.

After step ST6 or step ST7, the procedure proceeds to step ST8.

Figure 14:
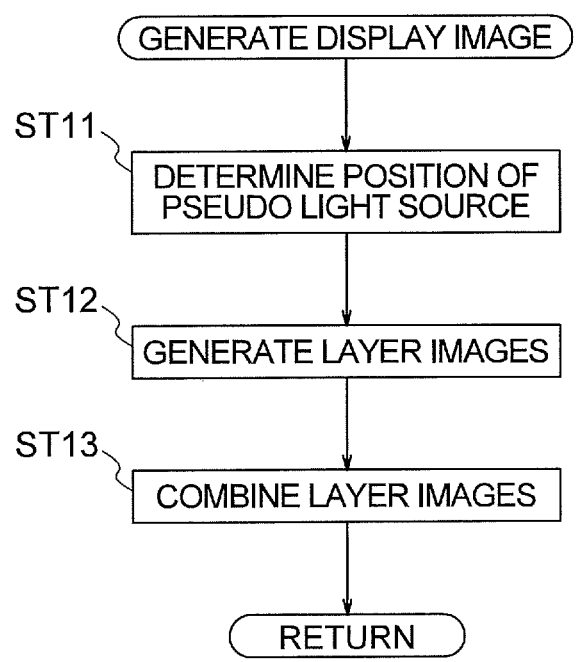
FIG. 14 is a flowchart showing a procedure of processes in the display image generation step in FIG. 13.

In step ST8, the display image generator 14 performs the display image generation process (FIG. 14).

Specifically, the layer image generator 15 generates the plurality of layer images based on the attribute information Ja acquired in step ST1, the information indicating the detected viewpoint, read from the memory 12m in step ST6, or the information indicating the predefined viewpoint position, read from the memory 15m in step ST7, the surrounding environment information Gc generated in step ST3, and the vehicle information Fa acquired in step ST4, and the layer image combiner 16 combines the plurality of layer images generated by the layer image generator 15, to generate the display image.

In step ST9, the layer image combiner 16 sends the display image generated in step ST8 to the display device 25, to thereby update the display image of the display device 25.

The display image generation process in step ST8 described above will now be described in further detail with reference to FIG. 14.

First, in step ST11, the layer image generator 15 determines the position of the pseudo light source in the virtual space, based on the information indicating the viewpoint position read in step ST6 or ST7.

In step ST12, the layer image generator 15 generates the layer images of the respective layers.

In step ST13, the layer image combiner 16 combines the plurality of images generated in step ST12, to generate the display image.

As was explained above, the information display apparatus 2 according to the first embodiment generates the images of the planar objects respectively corresponding to the visible surfaces of the constituent parts of the displayed article by disposing the objects at the depthwise positions corresponding to the depthwise positions of the above-mentioned visible surfaces and projecting the objects onto the virtual projection plane. The image of each layer is generated by integrating the images of the plurality of objects belonging to the above-mentioned each layer, and the display image is generated by combining the images of the plurality of layers.

In the generation of the image of each object, by moving the imagined pseudo light source illuminating the object together with the viewpoint 4E, it is possible to reproduce the changes in the brightness of the visible surfaces of the displayed article and the movement of the highlight part, accompanying the motion of the viewpoint 4E, thereby to improve the reality of the displayed image.

By performing bump mapping based on the texture information, it is possible to express the texture of the visible surface of the constituent part corresponding to each object, and to improve the reality of the displayed image.

In combining the layer images, a process of giving a motion parallax and a process of hidden surface removal based on the depthwise positions are performed. As a result, it is possible to faithfully reproduce the phenomenon in which, accompanying the motion of the viewpoint, the visible surfaces at different depthwise positions are moved by different quantities in response to the motion of the viewpoint, and to improve the reality of the displayed image.

Also, because the objects are planar, and no complicated, three-dimensional shape data is used, the process of calculations for the generation of the display image can be reduced. As a result, the process can be performed at a high speed, and the responsiveness to the motion of the viewpoint 4E of the observer, and the like can be improved.

Moreover, if the viewpoint information processor 12 is formed to perform the inter-frame interpolation of the viewpoint position information, it is possible to generate the viewpoint information which smoothly follows the motion of the viewpoint 4E.

By using the viewpoint information which smoothly follows the motion of the viewpoint, the display image changes smoothly following the motion of the viewpoint 4E, and display with a higher reality becomes possible.

In the example described above, the observer imaging device 22 is installed on the top of the display device 25, but the invention is not limited to such an arrangement. The observer imaging device 22 may be installed at a different position. For example, it may be installed at the bottom part of the display device 25, or within a housing of the display device 25. Also, it may be installed in the vicinity of the display device 25, or at a position separated from the display device 25. What is essential is that the observer imaging device 22 is provided to capture the image of the observer 4, making it possible to identify the position and motion of the viewpoint 4E from the captured image.

In the above-described embodiment, the position and motion of the pseudo light source are determined based on the position and motion of the viewpoint. Also, it was stated that the position of the viewpoint may be a relative position. This is because that the observer does not have accurate perception or memory on how the appearance changes depending on the viewpoint, but can feel the reality if the displayed image is changed in response to the motion of the viewpoint. Accordingly, the use of the information indicating the position of the viewpoint may be dispensed with, and the information indicating the motion of the viewpoint only may be used to change the image in response to the motion of the viewpoint, in the generation of the object images.

Second Embodiment

In the embodiment described above, the depth information Jd pertaining to respective objects stored in the attribute information storage device 11 represents the distances C1 to C5 from the reference plane L0. Alternatively, information representing the distance from the reference plane L0 with regard to the object(s) in a layer closest to the reference plane L0, and representing the distance from each of other layer(s) to the adjacent layer situated closer to the reference plane with regard to the object(s) in the above-mentioned other layer(s) may be stored.

Figure 15:
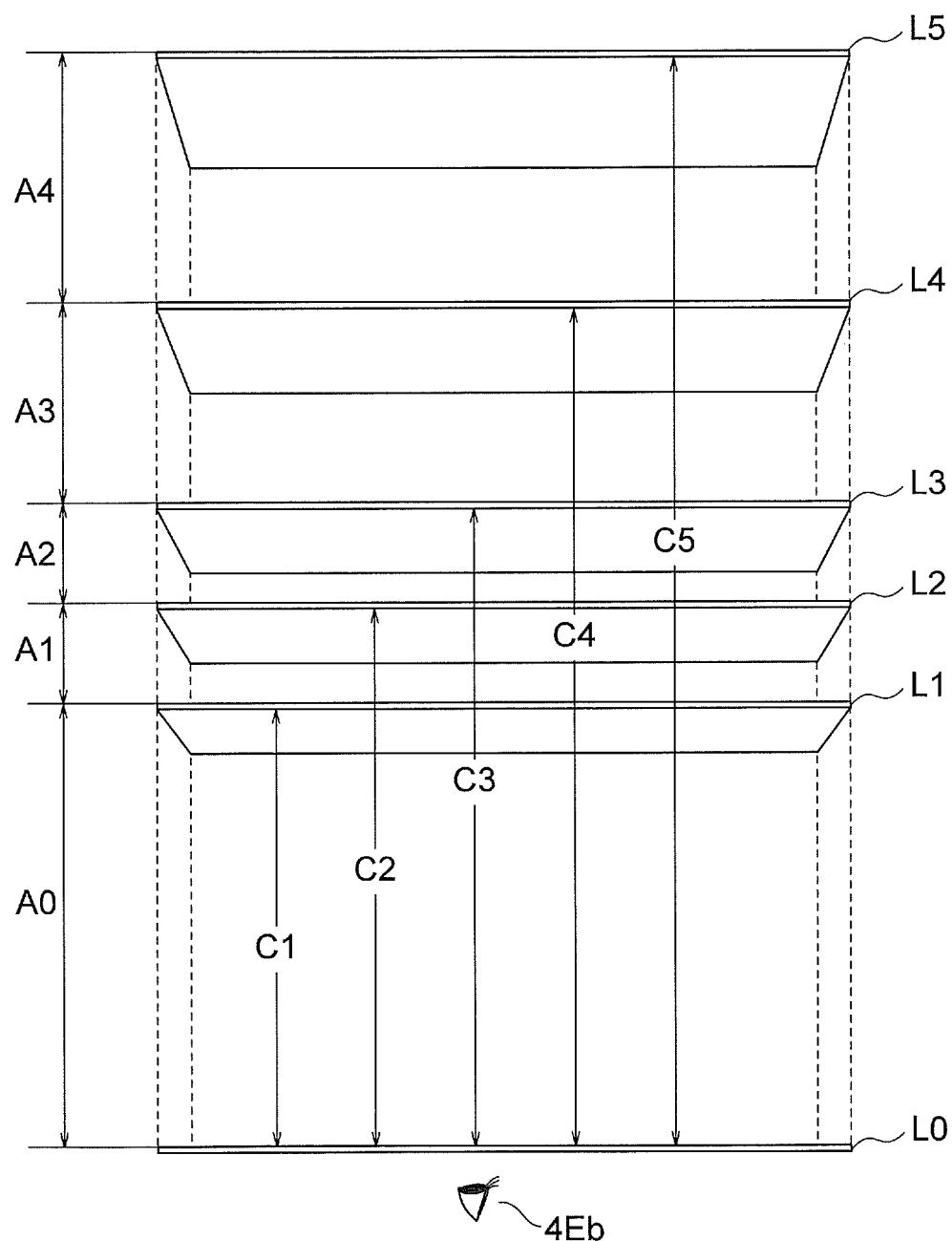
FIG. 15 is a diagram showing another example of depth information.

For example, as shown in FIG. 15, information representing the distance A0 from the reference plane L0 to the layer L1, a distance A1 between the layers L1, L2, a distance A2 between the layers L2, L3, a distance A3 between the layers L3, L4, and a distance A4 between the layers L4, L5 may be stored in the attribute information storage device 11.

In such a case, the layer image generator 15 and the layer image combiner 16 may read such depth information Jd from the attribute information storage device 11, and calculate the distances C1 to C5 from the reference plane L0, based on the distances A0 to A5 represented by the depth information Jd, and use the calculated distances C1 to C5 in the computation of equations (1) to (3).

Also, information representing the distance from the reference plane L0 with regard to the object(s) in the layer (first layer) closest to the reference plane L0 and the distance (s) from the layer (first layer) closest to the reference plane with regard to object(s) in other layer(s) may be used.

Figure 16:
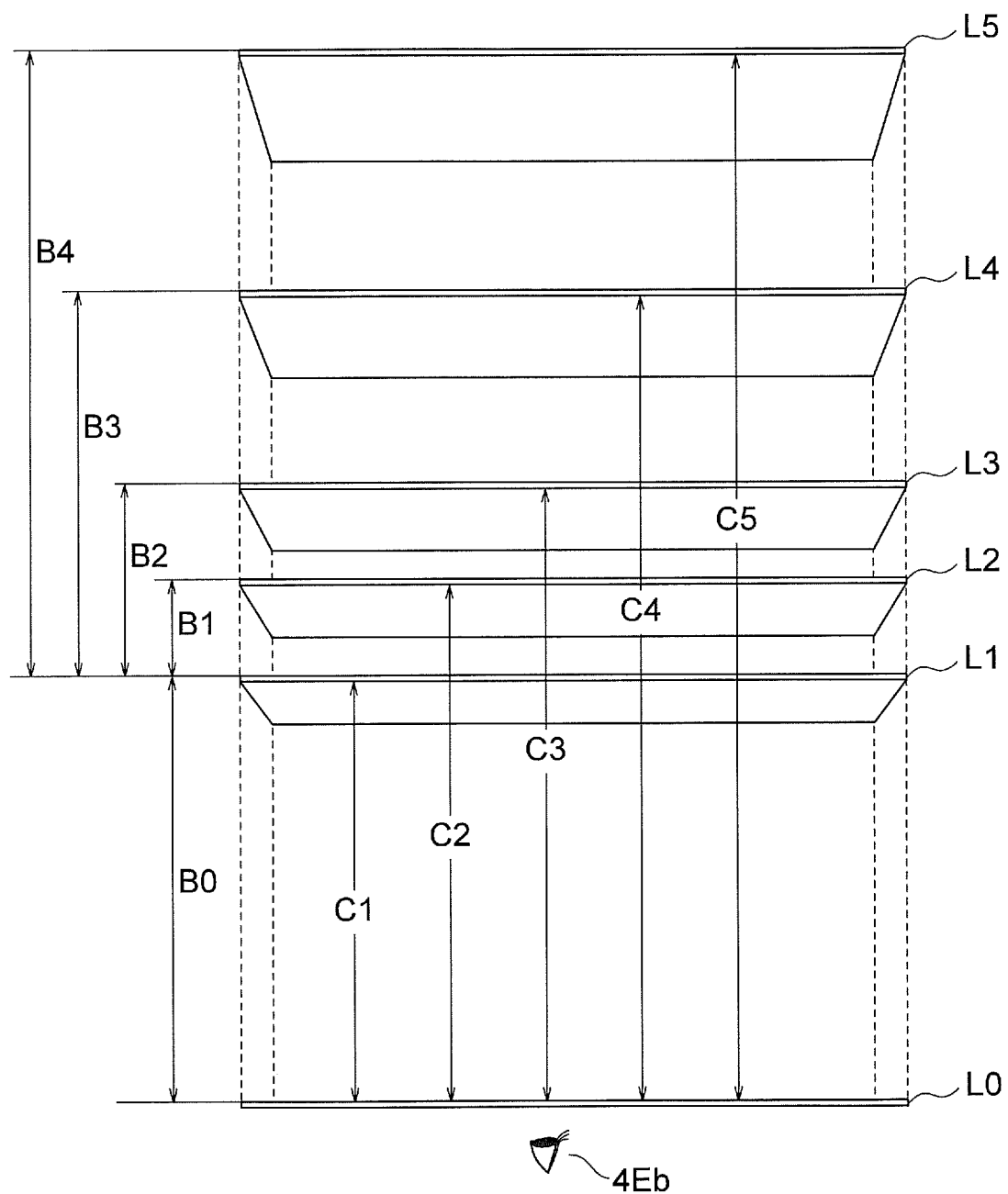
FIG. 16 is a diagram showing a further example of depth information.

For example, as shown in FIG. 16, information representing the distance B0 from the reference plane L0 to the layer L1, the distance B1 between the layers L1, L2, a distance B2 between the layers L1, L3, a distance B3 between the layers L1, L4, and a distance B4 between the layers L1, L5 may be stored in the attribute information storage device 11.

In such a case, the layer image generator 15 and the layer image combiner 16 may read such depth information Jd from the attribute information storage device 11, calculate the distances C1 to C5 from the reference plane L0, based on the distances B0 to B5 represented by the depth information Jd, and use the calculated distances C1 to C5 in the computations of equations (1) to (3).

Third Embodiment

In the first embodiment, as the depthwise position of the viewpoint of the observer, a standard position obtained from experience is used for the calculations according to the equations (1) and (2), for adjusting the brightness of the image based on the change of the depthwise position, and the calculation according to equation (3) for determining the quantity of movement of the layer image for giving a motion parallax. However, the present invention is not limited to such an arrangement, but the observer imaging device may measure the distance to the viewpoint of the observer, and calculate the distance from the displayed screen to the viewpoint based on the result of the measurement, and the calculated distance may be used for the generation of the image.

The distance to the viewpoint 4E may be measured by using, as the observer imaging device, an imaging device having a ranging function. As the distance to the viewpoint 4E of the observer, the distance to the head may be measured, for example.

As the imaging device having a ranging function, an imaging device having a ToF (Time of Flight) ranging function may be used.

Figure 17:
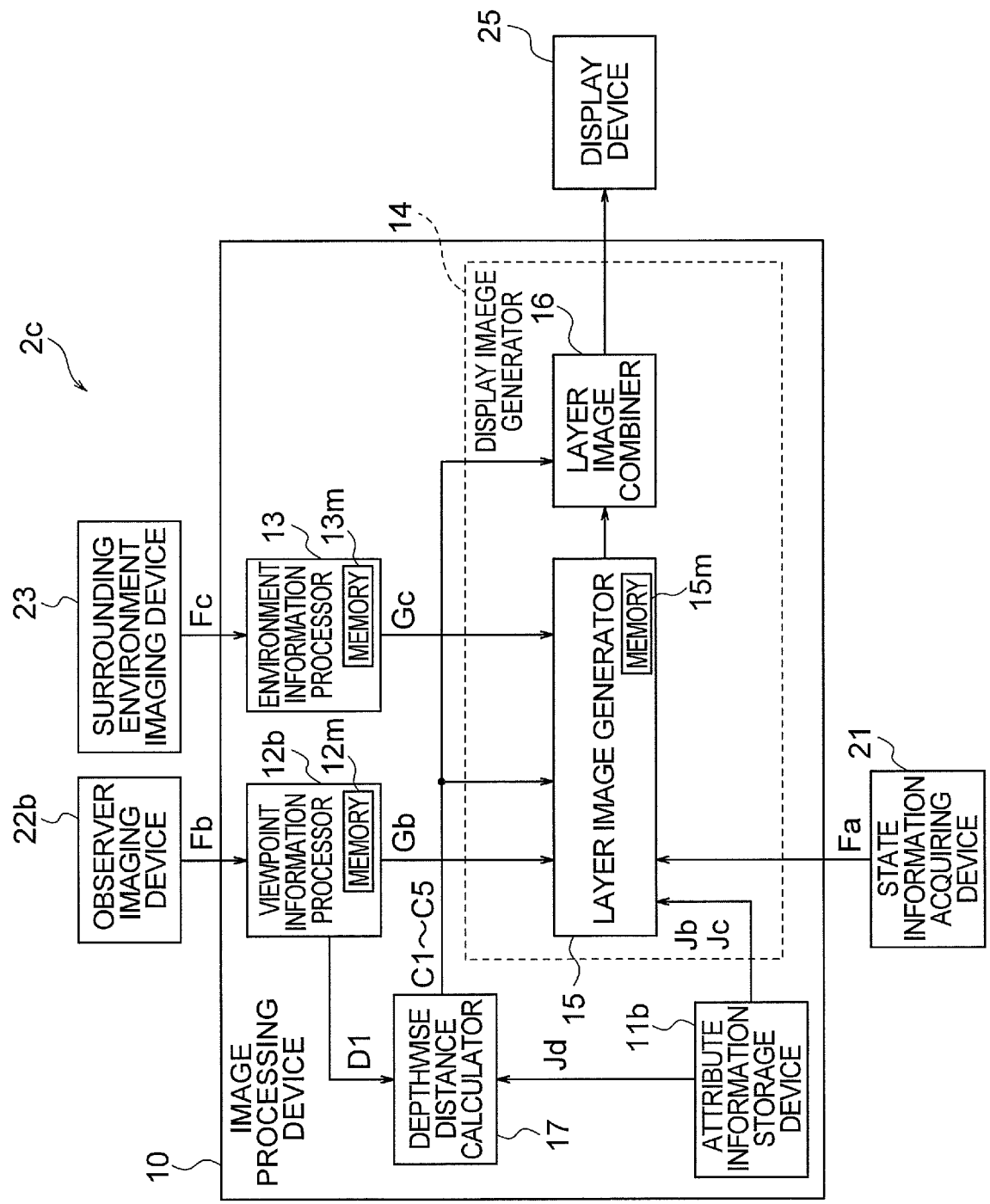
FIG. 17 is a block diagram showing a configuration of an information display apparatus according a third embodiment of the present invention.

FIG. 17 shows a configuration of an information display apparatus in which the distance to the viewpoint is determined by measurement.

The information display apparatus 2c shown in FIG. 17 is generally identical to the information display apparatus 2 shown in FIG. 1, but a depthwise distance calculator 17 is added, and the attribute information storage device 11, the observer imaging device 22, and the viewpoint information processor 12 are replaced by an attribute information storage device 11b, an observer imaging device 22b, and a viewpoint information processor 12b. The attribute information storage device 11b, the observer imaging device 22b, and the viewpoint information processor 12b are generally identical to the attribute information storage device 11, the observer imaging device 22, and the viewpoint information processor 12, respectively, but differ in the following respects.

The depth information Jd stored in the attribute information storage device 11b in FIG. 17 does not include the information representing the distance from the reference plane L0. That is, the information representing the distances between layers only is stored. For example, the information representing the distance A0 from the reference plane L0, among the distances shown in FIG. 15, is not stored, but the information representing the distances A1 to A4 between adjacent layers is stored, or the information representing the distance B0 from the reference plane L0, among the distances shown in FIG. 16, is not stored, but the information representing the distances B1 to B4 from the first layer is stored.

The observer imaging device 22b in FIG. 17 captures the image of the subject, and outputs the observer image. It also generates and outputs the information indicating the distance to the subject.

Based on the observer image and the information indicating the distance to the subject, outputted from the imaging device 22b, the viewpoint information processor 12b in FIG. 17 identifies the position of the viewpoint in the captured image, and generates the information indicating the distance from the observer imaging device 22b to the viewpoint 4E. Based on the distance represented by the generated information, the viewpoint information processor 12b calculates the distance D1 from the display screen 25Q to the viewpoint 4E, and generates information indicating the calculated distance D1, and supplies the generated information to the depthwise distance calculator 17.

When the observer imaging device 22b is on the same plane as the display screen 25Q, the distance from the observer imaging device 22b to the viewpoint 4E can be used, without change, as the distance D1 from the display screen 25Q to the viewpoint 4E.

Based on the information representing the distance D1 supplied from the viewpoint information processor 12b, the depthwise distance calculator 17 determines the distance C1 from the reference plane L0 to the first layer. For example, C1 is determined to be identical to D1. Furthermore, distances C2 to C5 are calculated, using the thus determined distance C1, and the distances A1 to A4, or B1 to B4 represented by the depth information Jd stored in the attribute information storage device 11b. Information indicating the thus determined distances C1 to C5 is supplied to the layer image generator 15 and the layer image combiner 16.

The layer image generator 15 receives the shape information Jb and the texture information Jc from the attribute information storage device 11b, and the information indicating the distances C1 to C5 from the depthwise distance calculator 17, and generates the layer images. In the generation of the layer images, the layer image generator 15 uses the distances C1 to C5 calculated by the depthwise distance calculator 17, for the calculations of the equations (1) and (2).

The layer image combiner 16 combines the plurality of layer images generated by the layer image generator 15, to generate the display image. In the combining, the layer image combiner 16 uses the distances C1 to C5 calculated by the depthwise distance calculator 17, for the calculation of the equation (3).

Furthermore, in the first embodiment, the change in the distance from the viewpoint 4E to the display screen 25Q is calculated based, for example, on the change in the area of the head in the observer image Fb, and the brightness of the image is changed according to the calculated change in the distance, whereas, in the third embodiment, the brightness of the image can be changed according to the change in the distances C1 to C5 calculated by the depthwise distance calculator 17.

In the present embodiment, the computation according to the equations (1), (2), (3) and the change of the brightness of the image in response to the forward or backward motion of the viewpoint are performed using the distance D1 calculated based on the result of measurement, so that the adjustment of the brightness and the determination of the motion parallax can be made more accurately.

The information display apparatus in the first to third embodiments is mounted on a vehicle. However, the present invention is not limited to such an arrangement. For example, the present invention is also applicable to a display apparatus mounted on a ship and displaying information indicating the state of the ship (ship information). Furthermore, the present invention is also applicable to a display apparatus displaying an image of an instrument panel other than those described above, for example, an instrument panel on a transport means of other kinds, such as an airplane, or an instrument panel other than those of a transport means.

The present invention has been described as an information display apparatus. But an information display method and an image display method performed in the above-described information display apparatus also form part of the present invention. Furthermore, a program for causing a computer to perform the processes in the above-described information display apparatus, information display method, or image processing method, and a computer-readable recording medium in which the above-mentioned program is recorded also form part of the present invention.

REFERENCE CHARACTERS 2, 2c: information display apparatus; 4: observer; 4E, 4Eb: observer's viewpoint; 10: image processing device; 11, 11b: attribute information storage device; 12, 12b: viewpoint information processor; 12m: memory; 13: environment information processor; 13m: memory; 14: display image generator; 15: layer image generator; 15m: memory; 16: layer image combiner; 17: depthwise distance calculator; 21: state information acquiring device; 22, 22b: observer imaging device; 23: surrounding environment imaging device; 25: display device; 101: CPU; 102: memory; 104, 105, 106: input interface; 107: output interface.

The invention claimed is:

1. An information display apparatus including:
an image processing device to generate a display image representing a displayed article;
a display device to display said display image; and
an observer imaging device to capture an image of an observer watching said display device, and output an observer image;

wherein
said image processing device includes:
   a viewpoint information processor to generate viewpoint information representing a position of a viewpoint of said observer based on said observer image; and
   a display image generator to generate images of a plurality of planar objects disposed in a virtual space, based on texture information pertaining to each of said objects, and said viewpoint information, and combine the images of said plurality of objects to generate said display image,
   wherein said plurality of objects respectively correspond to visible surfaces of a plurality of constituent parts of said displayed article that are visible from said observer, and
   each of said objects is disposed at a depthwise position in said virtual space corresponding to a depthwise position of the visible surface corresponding to said each of said objects, as seen from said observer.

2. The information display apparatus as set forth in claim 1, wherein said display image is similar to an image as seen by said observer when said displayed article is hypothetically placed at a position of said display device.

3. The information display apparatus as set forth in claim 1, wherein
   said virtual space is a space simulating a space in which said display device is placed, and
   said plurality of objects are disposed in parallel with a plane in said virtual space corresponding to a display screen of said display device.

4. The information display apparatus as set forth in claim 3, wherein
   said display image generator generates the images of said plurality of objects by projecting said objects onto a virtual projection plane disposed in parallel with the plane in said virtual space corresponding to the display screen of said display device.

5. The information display apparatus as set forth in claim 4, further including:
   a surrounding environment imaging device to capture an image of an environment surrounding said display device, and output a surrounding environment image;
   wherein
   said image processing device further includes:
   an environment information processor to generate surrounding environment information representing an optical environment surrounding said display device based on said surrounding environment image; and
   said display image generator generates the images of the objects based also on said surrounding environment information.

6. The information display apparatus as set forth in claim 5, wherein
   said display image generator adjusts luminance of each of said plurality of objects based on the depthwise position of said each of said plurality of objects.

7. The information display apparatus as set forth in claim 5, wherein
   said display image generator includes:
   a layer image generator to treat each of said plurality of objects as belonging to a layer imagined at a depthwise position identical to the depthwise position of said each of said plurality of objects and generate a plurality of layer images each comprising images of one or more objects belonging to each layer; and
   a layer image combiner to combine said plurality of layer images to generate said display image, by performing a process of giving a motion parallax and a process of hidden surface removal on said plurality of layer images based on the depthwise position of said each of layers and said viewpoint information.

8. The information display apparatus as set forth in claim 7, wherein
   said layer image generator moves a bright part of said layer images in response to movement of a viewpoint of said observer as indicated by said viewpoint information.

9. The information display apparatus as set forth in claim 1, wherein
   said observer imaging device captures the image frame by frame, and successively outputs the observer images of respective frames; and
   said viewpoint information processor generates said viewpoint information for each frame from the observer image for each frame, and performs interframe interpolation on the information indicating the position of the viewpoint included in said viewpoint information for each frame, thereby to generate information indicating the position of the viewpoint with a higher frame rate.

10. The information display apparatus as set forth in claim 1, further including a state information acquiring device to acquire state information determining a state of said displayed article, wherein
    said display image generator generates the image of said object based also on said state information.

11. The information display apparatus as set forth in claim 10, wherein
    said displayed article is an instrument panel of a vehicle,
    said state information acquiring device acquires, as said state information, information indicating a state of the vehicle to be indicated by said instrument panel.

12. The information display apparatus as set forth in claim 1, wherein
    when the position of the viewpoint in said observer image cannot be identified, said viewpoint information processor outputs detection failure information indicating that the position of the viewpoint in said observer image cannot be identified, and
    said display image generator generates the images of said objects assuming that the viewpoint is at a predefined position when said detection failure information is outputted.

13. An information display method in an image display apparatus including:
    a display device to display a display image representing a displayed article; and
    an observer imaging device to capture an image of an observer watching said display device, and output an observer image;
    said method including:
    generating viewpoint information representing a position of a viewpoint of said observer based on said observer image;
    generating images of a plurality of planar objects disposed in a virtual space, based on texture information pertaining to each of said objects, and said viewpoint information; and
    combining the images of said plurality of objects to generate said display image,
    wherein said plurality of objects respectively correspond to visible surfaces of a plurality of constituent parts of said displayed article that are visible from said observer, and each of said objects is disposed at a depthwise position in said virtual space corresponding to a depthwise position of the visible surface corresponding to said object, as seen from said observer.

14. A non-transitory, computer-readable recording medium in which a program for causing a computer to execute the processes in the information display method as set forth in claim 13 is stored.

* * * * *